(12) United States Patent
Vilar Llop et al.

(10) Patent No.: US 7,958,688 B2
(45) Date of Patent: Jun. 14, 2011

(54) ASSEMBLY SYSTEM FOR FLOOR AND/OR WALL TILES

(75) Inventors: Natividad Vilar Llop, Villarreal (ES); Salvador Llorens Miravet, Villarreal (ES)

(73) Assignee: Promociones Brial, S.L., Villarreal (Castellón) (ES)

( * ) Notice: Subject to any disclaimer, the term of this patent is extended or adjusted under 35 U.S.C. 154(b) by 193 days.

(21) Appl. No.: 12/078,152

(22) Filed: Mar. 27, 2008

(65) Prior Publication Data

US 2008/0245019 A1    Oct. 9, 2008

(30) Foreign Application Priority Data

| Mar. 29, 2007 | (ES) | ................................. | 200700831 |
| Mar. 14, 2007 | (ES) | ................................. | 200701309 |
| Jun. 6, 2007 | (ES) | ................................. | 200701779 |
| Jul. 9, 2007 | (ES) | ................................. | 200701920 |
| Dec. 24, 2007 | (ES) | ................................. | 200703428 |
| Jan. 11, 2008 | (ES) | ................................. | 200800072 |

(51) Int. Cl.
    *E04B 2/00* (2006.01)
(52) U.S. Cl. .................... 52/582.2; 52/586.2
(58) Field of Classification Search ............... 52/582.1, 52/582.2, 586.1, 586.2
    See application file for complete search history.

(56) References Cited

U.S. PATENT DOCUMENTS

| 905,189 | A | * | 12/1908 | Hyke ........................... 52/582.1 |
| 1,437,304 | A | | 11/1922 | Healy |
| 2,317,428 | A | | 4/1943 | Anderson |
| 3,082,488 | A | | 3/1963 | Nusbaum |
| 3,205,633 | A | | 9/1965 | Nusbaum |
| 3,295,272 | A | | 1/1967 | Kanno |
| 4,573,299 | A | | 3/1986 | Meroni |
| 4,945,697 | A | * | 8/1990 | Ott et al. ..................... 52/403.1 |
| 6,237,295 | B1 | | 5/2001 | Ballard |
| 6,449,918 | B1 | * | 9/2002 | Nelson ........................ 52/582.1 |
| 6,453,632 | B1 | | 9/2002 | Huang |
| 2003/0145549 | A1 | | 8/2003 | Palsson et al. |
| 2004/0258869 | A1 | | 12/2004 | Walker |

FOREIGN PATENT DOCUMENTS

DE    21 16 407    10/1972

(Continued)

OTHER PUBLICATIONS

Spanish Search Report, issued Aug. 24, 2009 in Spanish Application 200700831, which is a counterpart to the present application (with partial English translation).

(Continued)

*Primary Examiner* — Jeanette E Chapman
*Assistant Examiner* — Daniel Kenny
(74) *Attorney, Agent, or Firm* — Wenderoth, Lind & Ponack, L.L.P.

(57) ABSTRACT

An assembly system for floor and/or wall tiles includes anchors between tiles arranged in a coplanar plane. The anchors are determined from portions curved in the shape of a groove located in the underside of the tiles and matching the side edges of the tiles that guide the curved portions to converge on the edges. When the tiles are put together next to each other head to head and at the point where the corners converge, these curved grooved portions form a channel on the underside of the tiles inside which male elements fit tightly in at least a portion of it to couple and engage at least two adjacent tiles.

30 Claims, 25 Drawing Sheets

FOREIGN PATENT DOCUMENTS

| | | |
|---|---|---|
| DE | 91 01 959 | 8/1991 |
| DE | 42 22 936 | 1/1994 |
| DE | 100 45 475 | 4/2002 |
| EP | 0 203 226 | 12/1986 |
| EP | 0 671 508 | 9/1995 |
| EP | 1 741 852 | 1/2007 |
| EP | 1 771 630 | 8/2009 |
| ES | 1 061 722 | 3/2006 |
| ES | 1 063 249 | 10/2006 |
| GB | 1 340 184 | 12/1973 |
| WO | 2004/090257 | 10/2004 |

OTHER PUBLICATIONS

Spanish Search Report, issued Sep. 18, 2009 in Spanish Application 200701920, which is a counterpart to the present application (with partial English translation).

Spanish Search Report, issued Aug. 26, 2009 in Spanish Application 200701309, which is a counterpart to the present application (with partial English translation).

Spanish Search Report, issued Aug. 26, 2009 in Spanish Application 200701779, which is a counterpart to the present application (with partial English translation).

Spanish Search Report, issued Sep. 29, 2009 in Spanish Application 200703428, which is a counterpart to the present application (with partial English translation).

Spanish Search Report, issued Feb. 18, 2010 in Spanish Application 200800072, which is a counterpart to the present application (with partial English translation).

* cited by examiner

ASSEMBLY SYSTEM FOR FLOOR AND/OR WALL TILES

OBJECT OF THE INVENTION

The present invention, as expressed in the title of this descriptive report, refers to an assembly system for floor and/or wall tiles applicable to assembly flooring such as a parquet type floor, made of wood or any other material, that are put together with assemblage means installed between the different parts or tiles that are the components of the flooring system.

Therefore, one object of the invention is the characteristic hidden means of assembly that facilitate the assembly process while ensuring the complete stability and immobilization of the tiles.

Another object of the invention is that it includes means to obtain a raised and removable modular floor that allows the extraction of some of the tiles in order to access the space below said tiles whenever necessary to inspect or repair the installations or utility networks running through the space created under the raised floor.

Another object of the invention is a particular tongue and groove system that optimizes maximally the tile joining process to create a specific wall or floor covering area. Therefore, this object of the invention is to achieve a perfectly flushed tile surface, as well as a correct guiding and placing mechanism of the tiles during the assembly process, ensuring a correct final positioning while expanding the combination possibilities, since the system object of the invention allows the tiles to be assembled on any one side of their perimeter.

Another object of the invention is to achieve tile-to-surface anchoring means applicable for flooring or wall coverings. These anchoring means are especially helpful when used for wall coverings, because it does not require adhesive materials. This system can also be used for floor coverings. It is also applicable for tiles without the male or female portions on their lateral edges.

BACKGROUND OF THE INVENTION

There are several tile anchoring means in the current state of the art for parquet type removable floors. The current assembly systems are very diverse and are based on tiles that can be fitted together, although it has not been possible yet to optimize the assembly process due to various difficulties that have not yet been overcome and because the final results obtained may show mismatching or lack of flushing between the various individual tile elements.

There are also some embodiments of floor and wall covering tiles known in the art that feature a great variety of connecting elements, such as tongue and groove systems and conventional connection metal elements amongst others.

The tongue and groove systems are continuous system lacking reference points for correct longitudinal adjustment. These systems allow offset assembly systems in the longitudinal dimension, but without a clear reference point and permitting installation only in one direction, which precludes the flexibility of assembling the covering elements in various directions.

This type of floor and/or wall coverings is described in, for instance, Utility Model U-200300678 and Patents of Invention WO 2007/044293 and US 005438809.

Said Utility Model refers to a parquet floor assembly system designed so the profiled edges of the elements can be joined without glue. It includes parts joined by a tongue and groove system in which every flooring element is fitted with a longitudinal flange that fits inside the matching longitudinal channel of the next tile.

This system is characterized in that the longitudinal flange has a trapezoidal section with a lateral triangular enlargement configured by a tooth that fits behind a trapezoidal engrossed section located in the lateral face of the insertion channel.

This Utility Model, as mentioned before, does not have a longitudinal reference to help lay a flooring element in relation to the others.

The inventions described in the Patents of Invention mentioned above also have this disadvantage.

DESCRIPTION OF THE INVENTION

In order to attain the objectives of the invention and overcome the disadvantages of the systems mentioned in previous sections, the present invention proposes an assembly system for floor and/or wall tiles having significant improvements from conventional assembly systems, especially in terms of the ease and intuitiveness of installation, tile adjustment, and inclusion of assembly connecting elements or joints.

The system object of the invention is characterized in that it includes special anchoring means between tiles that are not visible once the floor has been installed, that is, said anchoring means are located in the tiles' underside.

These anchoring means are characterized in that they comprise male elements configured as curved structures that fit in a matching and complementary manner inside the corresponding annular channels or grooved elements located in the underside of the tiles.

These annular grooves having a closed contour affect, at leas, two adjacent tiles. When the tiles have, for instance, quadrangular or rectangular shapes, an annular groove or channel may affect four adjacent tiles when said channel is found in the adjacent corners of said four tiles (it is then ring—shaped). In this case each tile will be affected by a portion of the groove with 90° angular amplitude. The grooves openings match the perimeter edges of the surface covered by the tiles.

Another characteristic of the invention is that each male element associates at least two adjacent tiles, that is, a male element is fits in groove or channel portions that belong to at least two other tiles, although it can be fitted in arrangements that include three or more tiles, depending on the shape of the tiles and on where the grooves or channels are arranged in the tile.

Normally, the tiles have the matching grooved contours (female elements) and the projecting contours (male elements) on their frontal edges in order to achieve a perfectly flushed surface between tiles, better element fit, and better control of the vertical and horizontal travel paths of the tiles during installation, both during and after assembly, although this added tongue and groove arrangement could vary in shape and configuration, not being the main object of the present invention.

Usually said perimeter tongue and groove joining arrangement will comprise alternated projecting and recessed elements distributed regularly to allow offset assembly arrangement of adjacent tiles at any point of their contour, as well as their relative rotation, to achieve specific decorative effects.

Also, the frontal and lower fit of this tongue and groove system will be somewhat loose to allow enough clearance to admit strange particles or bodies. Also the edge rims will be rounded to make the assembly process easier.

The tile architecture as well as the essentially metallic structure of the anchoring elements enables the system's assembly process to be maximally optimized, because said anchoring means are easily installed since they can be inserted when the tile has already been laid in its definitive position and fitted inside the receiving groove by applying pressure, which allows the tile to slide along the groove to assemble the tiles in place.

Said male elements have a specific architecture, specifically those male elements that are shaped as a semi-circumference. Their width is not uniform throughout their length, rather, the angle of the curvature radius of their external wall varies to facilitate the anchoring operation and achieve a perfect fit into place.

In another embodiment said elements may also be fitted with characteristic connecting elements shaped as an inverted "T", which arms fit inside facing slits located on the edges or edges' rims of the tiles, while the cross tie of the joining elements fits inside the narrow separation space found between two adjacent tiles serving as the spacing joining element proper.

These spacing joining elements make possible a large range of aesthetic embodiments based on the open joint style and are very convenient for tiles that incorporate ceramic elements that are part of the floor surface that will support foot traffic, preventing edges from breaking when they come into mutual contact. In this particular case, said ceramic elements will be glued to a lower base, that will be equipped with the aforementioned slits in its lateral edges. In the open joint embodiment, the free edge may be located below the tiles free surface (sic), resulting in a slit that can be filled with a material.

In a different embodiment of the joining technique the tiles are connected by the mid and end points of their sides.

There are different types of connecting means that can be manufactured, for instance, with a rigid material shaped as semi-rings or horse shoes and slightly less thick than the gap intended to receive them located in the underside of the tile, where it will serve to connect the constitutive elements of the tiles.

In this embodiment, said affixing male elements have a specific architecture, more specifically those that are shaped as semi-rings, in which the width is not uniform throughout their length, rather, the angle of the curvature radius of their external wall varies, which in turn makes the anchoring operation easier.

Therefore, in order to insert said projecting elements or ridges, the arched grooves (or insertion channels) of the removable tile flooring system have been modified to provide appropriate housing for said projecting elements of the anchoring means, whether metallic or made of any other material. Said modification entail opening a groove on the corresponding internal lateral face of the anchoring means matching the anchoring mean in question, providing thus the appropriate receiving space for the technical modification of the invention.

Said improvement of the anchoring means as described above, was necessary to obtain a more secure fit between the anchoring elements and the tiles to prevent said anchoring means from escaping from the housing, ensuring greater global firmness for the entire structure of the invention.

Another possibility offered by the present invention is a raised floor, the invention being characterized in this case because the corners of the tiles rest directly on characteristic wedges that by virtue of being raised from the support base form a space below the tile assembly and throughout the entire surface of the floor, except at those points where the wedges are located to offer the tiles a contact space. The purpose of creating such a raised cavity under the floor's surface is to provide space for wiring and the conductions of different utilities and systems.

Considering a floor configured by quadrangular or rectangular tiles, each wedge will provide support for the four confluent corners of four adjacent tiles, so another characteristic of the invention is that one set of tile pairs arranged in one of the diagonal courses can be extracted to access the utility or wire networks, while the corresponding opposite tile pair also arranged in a diagonal course, are fixed together and, in principle, cannot be extracted.

In order to attain this characteristic combination of raised floor and sets of removable and fixed tiles, both types of tiles incorporate, at least, in the underside of their corners the rabbets described immediately below.

The rabbets of the removable tiles are characterized in that they comprise a circularly shaped section with an angular amplitude of 90° that matches the pair of corresponding and complementary projections of the same shape located on the upper face of the wedge located immediately below that serves to raise and support the tile.

On the other hand, the rabbets of the non-removable or fixed tiles are characterized in that they comprise channel like portions in which the groove describes a circumferential path that follow the curved part of the circular section rabbets and also the curvature of the arched sections of the support wedges, in such a manner that the arched male elements that encompass a particular angular width fit inside said grooved portions in a manner similar to that explained in the main Patent of Invention. The rabbets of the removable tiles enable such coupling and firm insertion of the male elements inside the grooved elements.

Another characteristic of the invention is that the perimeter of the fixed tiles is beveled to separate the lower part—which surface is larger than that of the lower part—from the smaller upper part, while the perimeter of the removable tiles is also beveled to separate the upper part—which surface is greater than the lower part—from the lower part, an arrangement that makes possible to fit both groups of tiles together by their adjacent edges.

This matching fit would not be possible if the lower part of the fixed tiles did not feature a characteristic 45° bevel in all the corners tangential to all the vertices of the upper part of the fixed tiles.

Another characteristic of the invention is that the edge rims of the fixed tiles are fitted with perimeter grooves located in the band that separates the upper from the lower part of the tile, which function is to receive one of the arms of a spacing joining element shaped as an inverted "T", which cross tie will then be vertically arranged to act as tile spacing element. The other arm of the "T" will be inserted between the upper perimeter band of the lower part of the fixed tiles and a perimeter band of the upper part of the removable tiles.

In other embodiments, the tiles are characterized in that their lateral edges are fitted with alternating male and female elements in a varying and even number and preferably located at a midway location of the thickness of the edge of said tile. In this arrangement the first male elements protrude outwards from the maximum perimeter of the visible top surface while the female elements are hidden inside said maximum perimeter.

The fact that the system incorporates both male and female elements (on the same sides) makes possible that one tile can be connected to another tile by making any one side of a tile (with one type of connector) to coincide with any one side of another adjacent tile (having a matching connector).

The male and female elements are set so they face each other in opposite sides of the tiles.

Another innovation contributed by the invention is that the male and female elements feature characteristic assembly means or assembly surfaces that direct and guide the coupling of tongue and groove configurations of the male and female elements when the tiles are connected one to another, particularly in terms of the space that will be occupied by a tile when delimited by several previously assembled tiles, and more specifically, in terms of the corner area delimited by said tiles. The tongue and groove coupling system will also contribute to achieve a flush floor or wall surface.

Therefore, the characteristic structure of the male and female elements allows for an easy and convenient tile assembly process, while ensuring a correct matching fit and laying without there being a possibility of laying the tiles incorrectly, since the guiding means direct and position the tile in its definitive position in relation to the remaining tiles, controlling any type of unwanted movement out of its designated place.

To do this, in any one embodiment, the end parts of the male and female elements comprise assembly surfaces that offer a wide range of assembly possibilities in terms of the angle at which the male element is inserted inside the female element.

In another embodiment the male and female elements feature an angular configuration defining a planar path shaped as a triangular wave.

In another embodiment the male and female elements feature an arched structure defining a planar path shaped as a sinuous wave.

The invention also provides the possibility of creating extensions to prolong the perimeter of the lower side of the tile to create cavities for the anchoring means to affix the tile to the surface to be covered. To that effect, the tiles will be fitted with orifices for screws or similar affixing devices.

Another characteristic of the invention is that tile to floor or wall surface anchoring means have been provided in such a manner that their action precludes the use of glue or any other affixing means to ensure tile immobilization, particularly when the tiles are used as wall covering.

Said anchoring means, once the floor or wall surface has been covered with the tiles, are then hidden from view.

Another characteristic is that these are mechanical means consisting in small parts having end portions that hook onto certain areas of the side edge rims of the tiles without interfering in the tile edge-to-tile edge contact.

The anchoring means comprise independent parts that have an affixing base that sits on the surface that will be tiled and an elbow shaped end portion that engages the corresponding edge rim of the side of the respective tile.

The affixing base is affected by an orifice, normally a conical mounting hole, that ensures the structures are affixed together by means of a screw which head will be housed in said mounting hole after its point goes through it.

In this manner the perfect engagement of the wall or floor tile is ensured without impinging on the anchoring means between the tiles.

The structure of the anchoring elements also has the positive result of generating a thin insulation chamber that improves the general state of the assembly, particularly in irregular floors or walls and/or floor or walls affected by humidity.

The next section is a list of figures intended as an aid for the better understanding of the contents of this descriptive report, of which said figures are an integral part. Said figures are intended for illustrative rather than limiting purposes of the scope of the object of the invention.

DESCRIPTION OF THE PREFERRED EMBODIMENT

Considering the ordinal numbering of the figures, the assembly system for floor and/or wall tiles can be applied in principle, to a removable parquet type floor with quadrangular tiles which lateral edges are affected by receiving spaces or female elements 1 and complementary projecting elements or male elements 2 intended to facilitate the initial positioning of the tiles with which the floor will be configured.

Using this as initial premise, the tiles incorporate in their undersides, and corresponding to the lateral edges, grooved curved portions 3 and 4 that confluence in precisely said edges, in such a manner that when the tiles are put together by their adjacent edges and convergent corners, said grooved curved portions of one tile complementing said grooved curved portions of the other tiles, so together configure a closed contour element in the shape of a ring or annular groove or channel, each one of which will receive male elements 5 and 6 also curved to fit said channel, that will encompass, preferably, angular spaces of 180° and 270° affecting at least two adjacent tiles, and thus ensuring a stable and unmovable fit between the engaged tiles.

Figure 1:
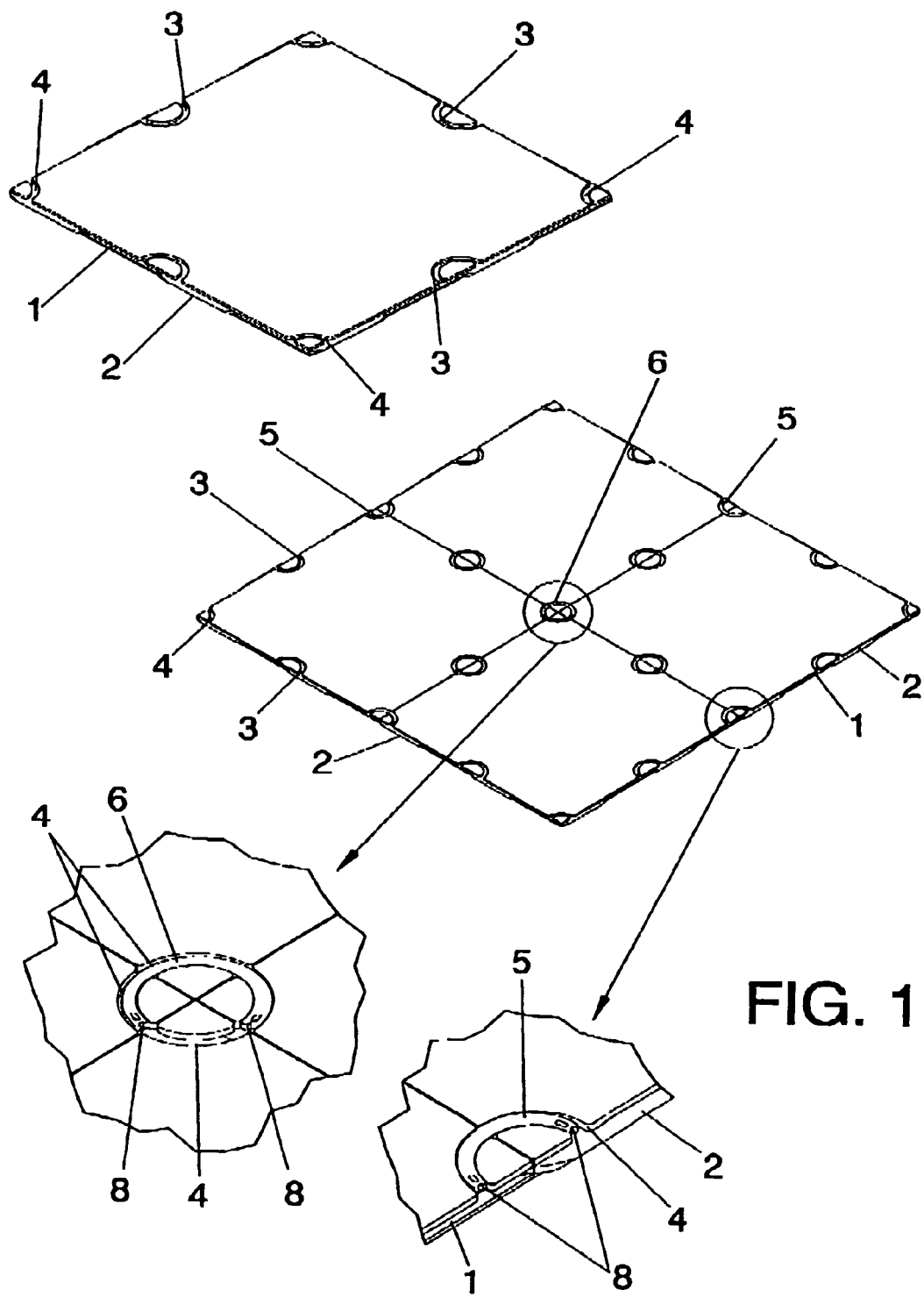
FIG. 1.—Shows a perspective view of a portion of the removable floor configured by tiles that is part of the assembly system for floor and/or wall tiles, object of the invention.

Considering two tiles engaged by their respective facing edges (FIG. 1), at the center of said edges there are two facing grooved portions 3 having an angular amplitude of 180° that configure the respective groove in which a male element 6 with 270° angular amplitude will fit to ensure said two tiles are anchored.

However, when four adjacent tiles converge by their corner ends, the grooved part of each tile will have an angular amplitude of 90° 4, and the resulting groove element will be occupied by another male element 6 that will affect at least three of the four tiles involved.

In the perimeter edges of the floor surface thus obtained, male elements 5 will join together pairs of adjacent tiles by fitting inside open grooves defined by two portions of the 90° groove 4.

Figure 2:
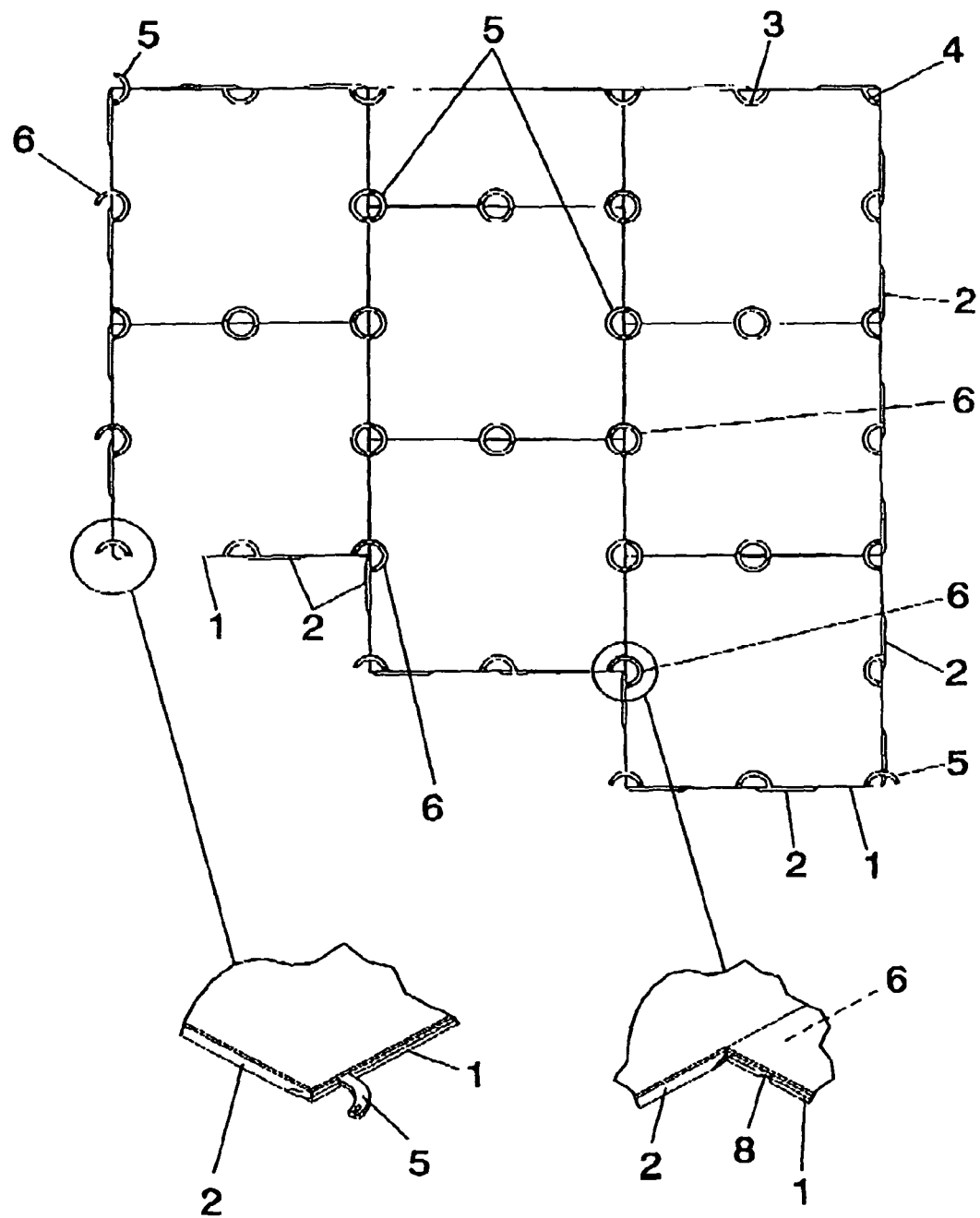
FIG. 2.—Shows a plan view of the removable floor with a different distribution than that shown on the previous figure.
Figure 3:
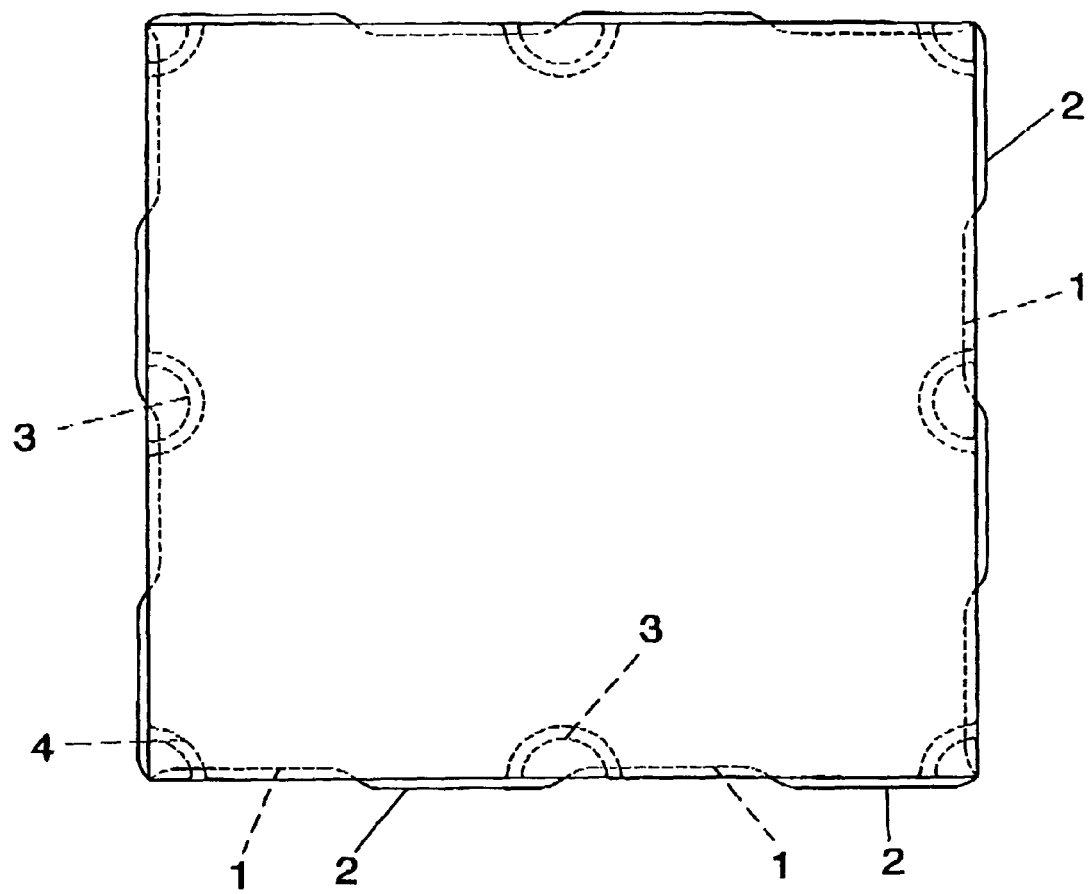
FIG. 3.—Shows a plan view of one of the tiles object of the invention.
Figure 4:
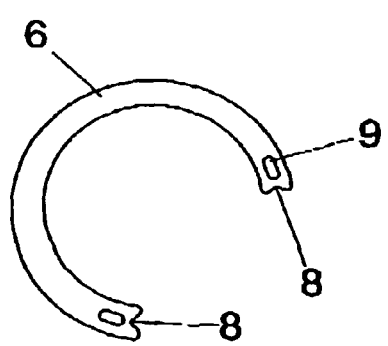
FIGS. 4 and 5.—Show a plan view of the male elements that are part of the invention.
Figure 5:
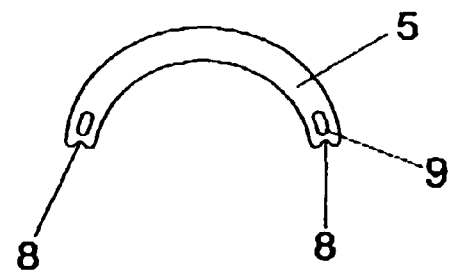

On the other hand, and as shown in FIG. 2, when the tiles are assembled in an offset herringbone type pattern, the closed groove elements are formed by an 180° groove portion 3 contributed by one tile and two 90° groove portions 4 contributed by two other tiles.

Figure 6:
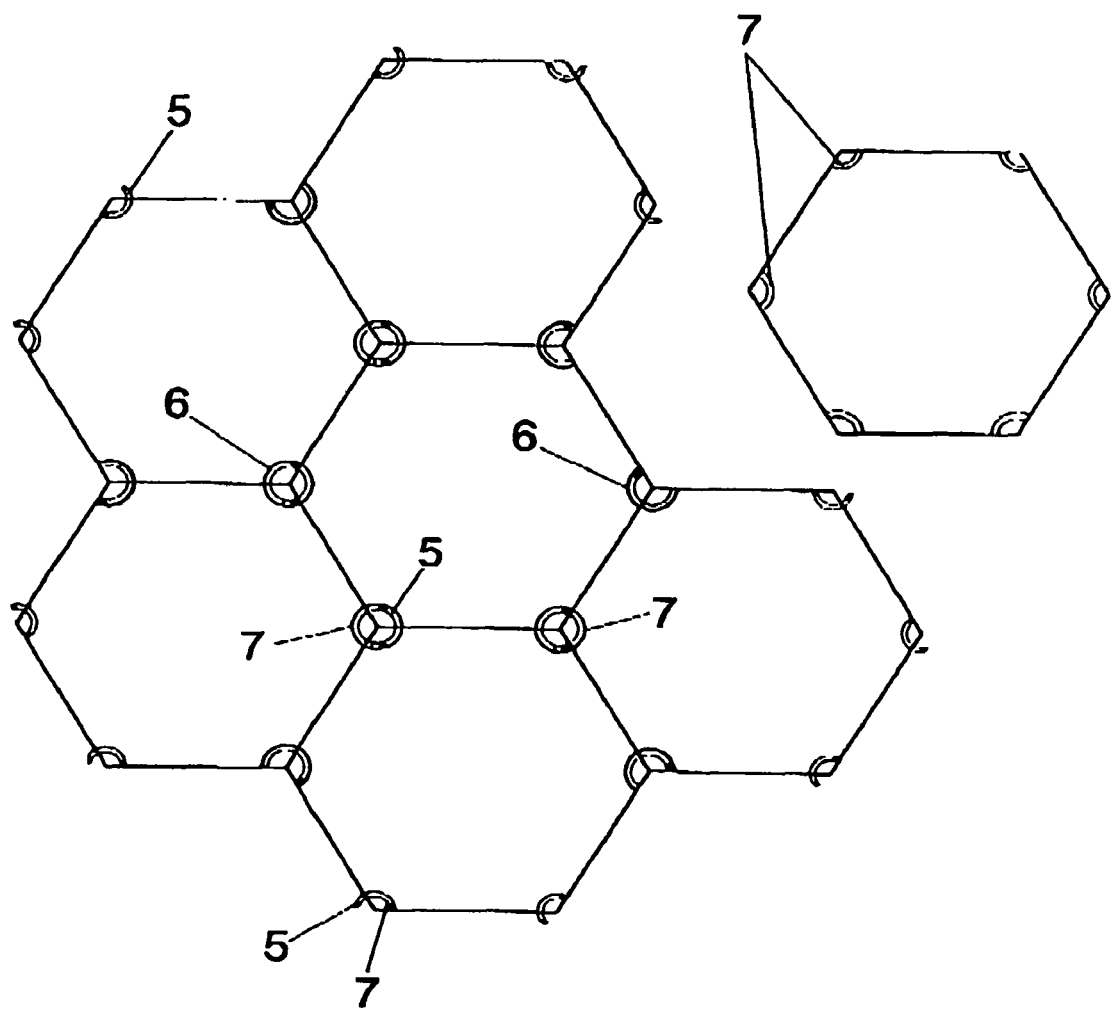
FIG. 6.—Shows a plan view of one of the applications of the invention depicting hexagonal tiles.
Figure 7:
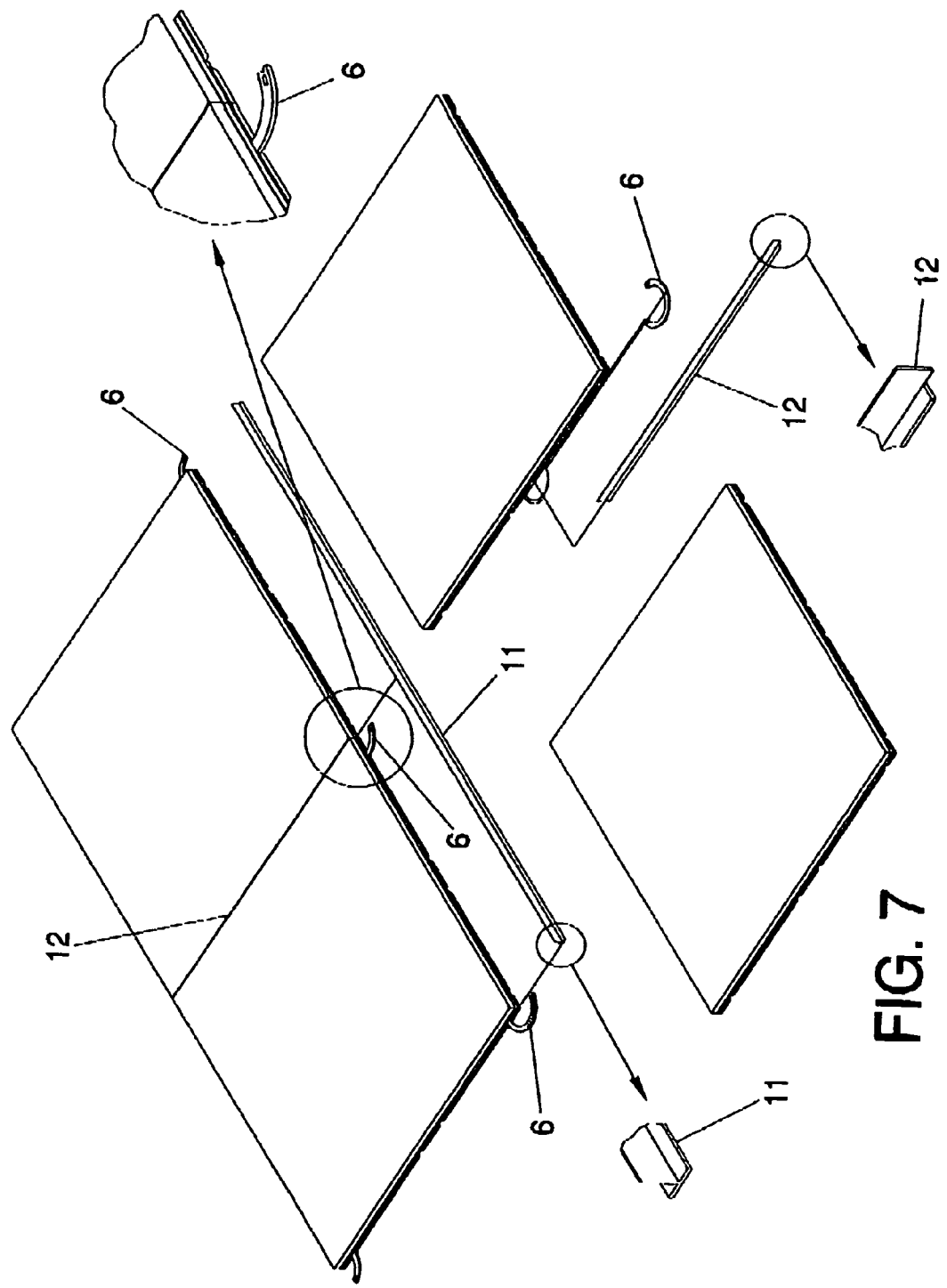
FIG. 7.—Shows a perspective view of a removable floor including connector elements that serve as tile spacing elements.
Figure 8:
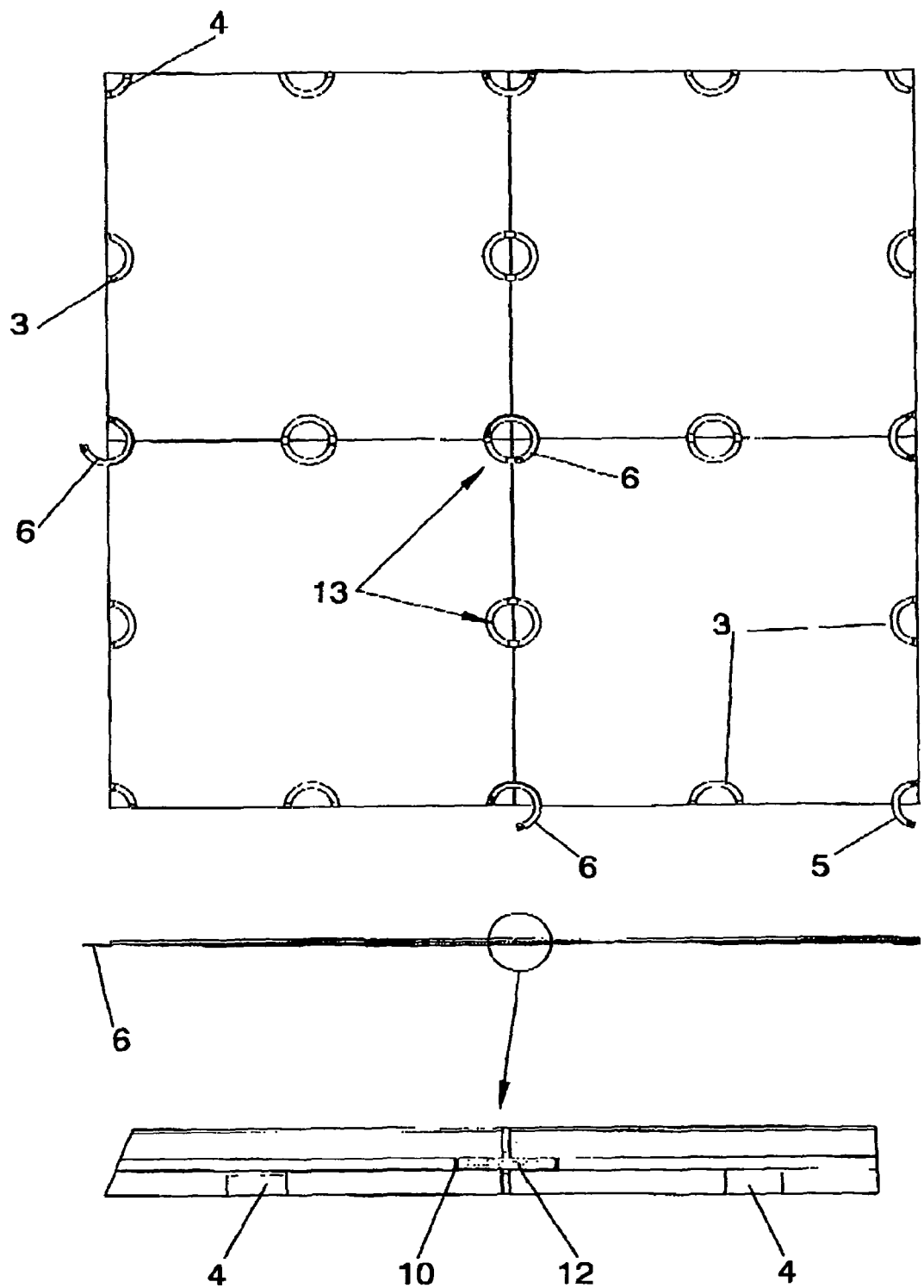
FIG. 8.—Shows a section view of the perspective shown in the previous figure.
Figure 9:
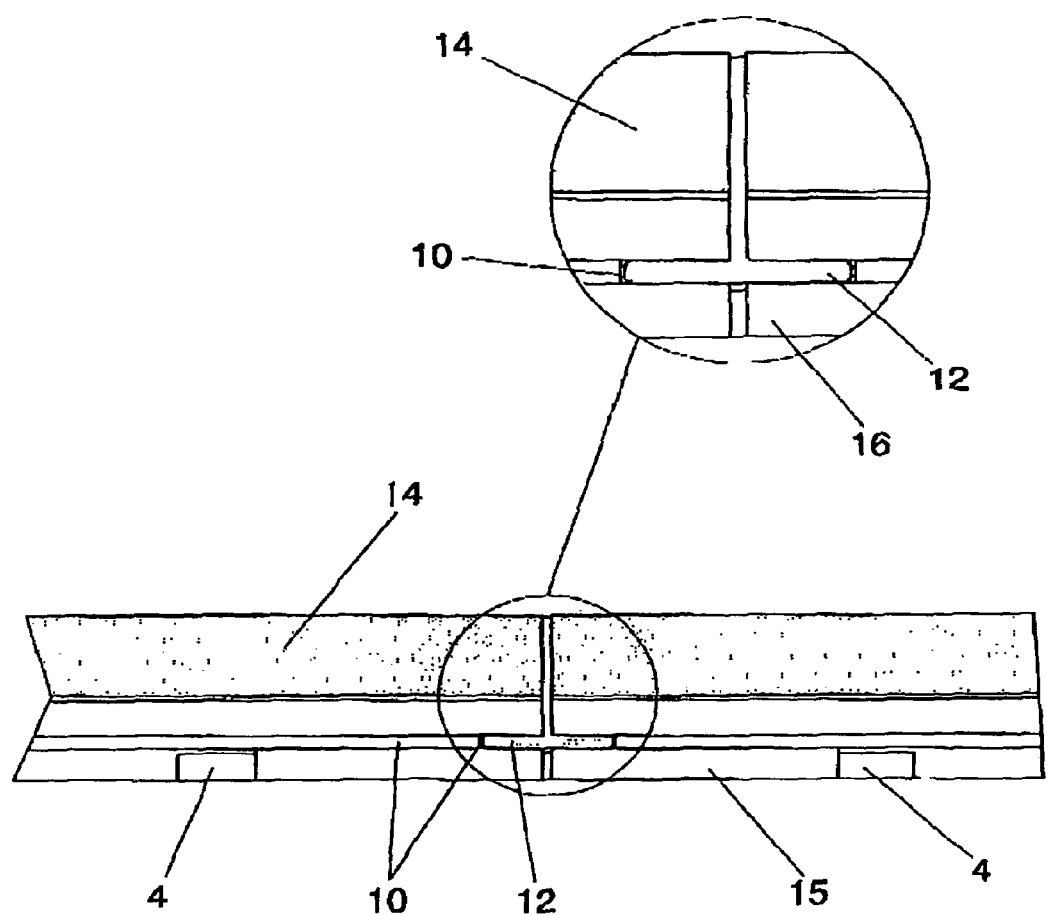
FIG. 9.—Shows a view similar to the previous one that incorporates ceramic elements as upper elements to support foot traffic on the floor surface.
Figure 10:
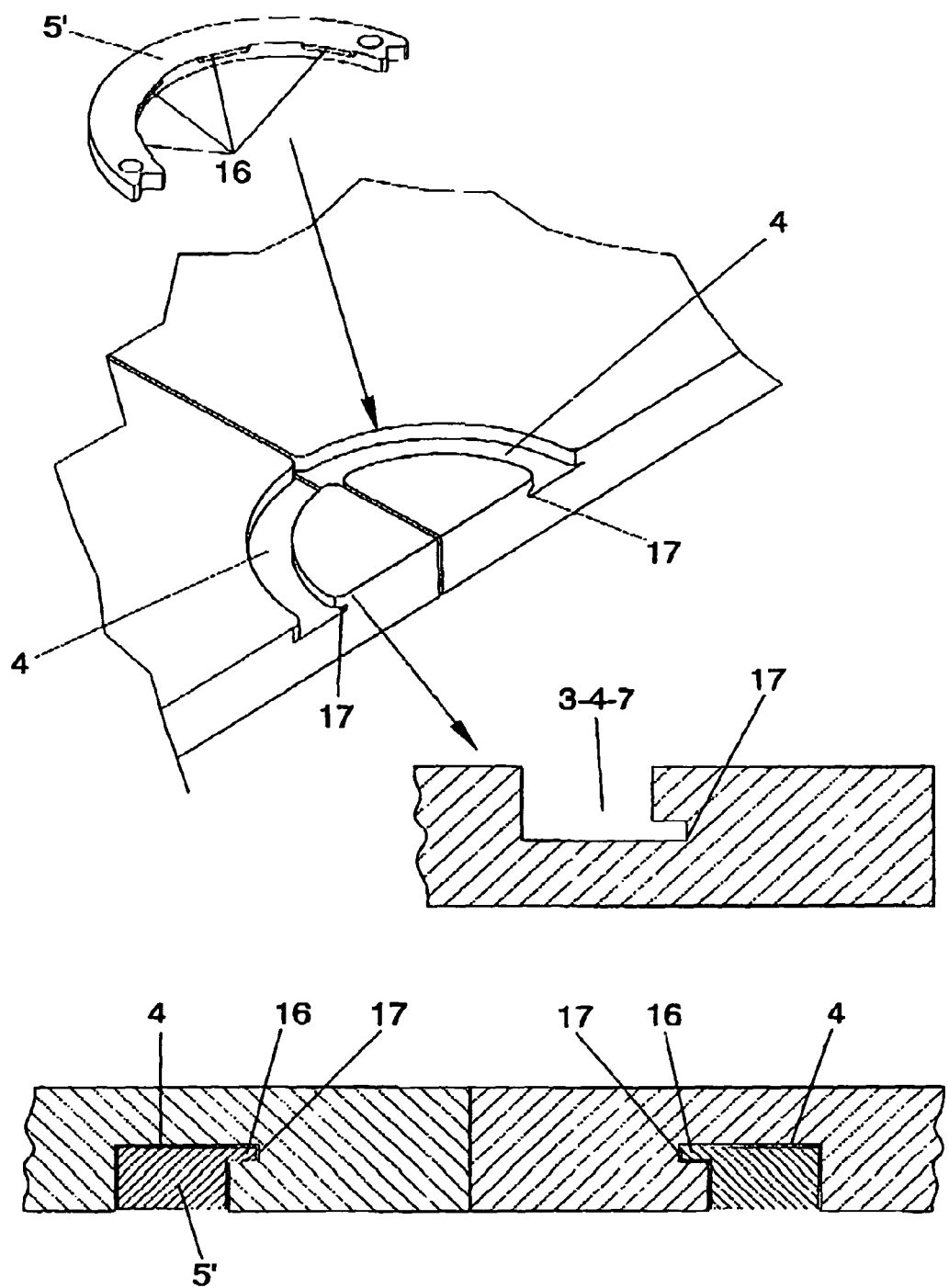
FIG. 10.—Represents a perspective view of a sectioned detail showing essentially the structure of new male elements intended to ensure tiles are firmly anchored together.
Figure 11:
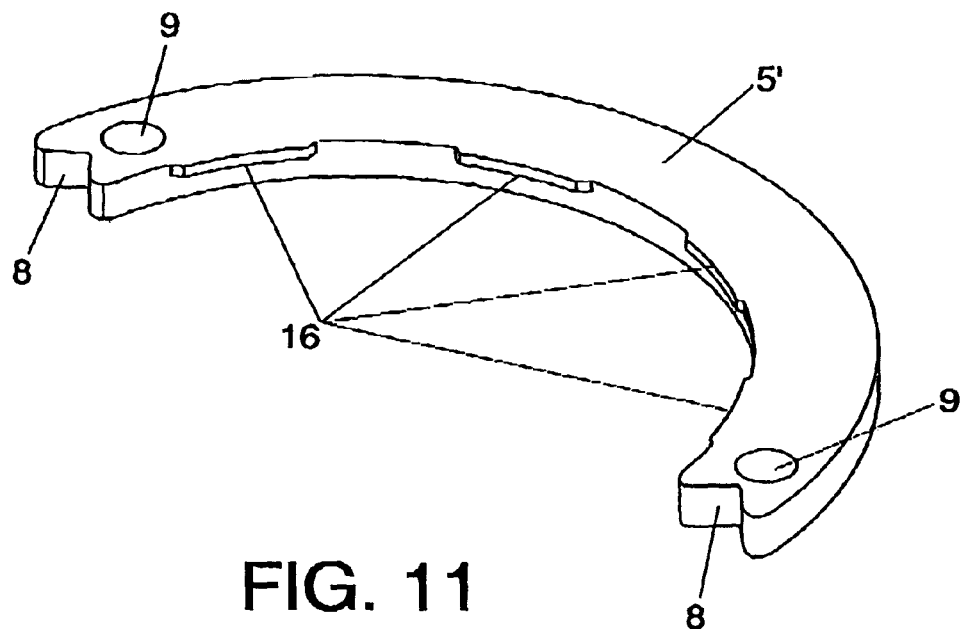
FIGS. 11 and 12.—Show respective perspective views of the anchoring elements described in FIG. 10.
Figure 12:
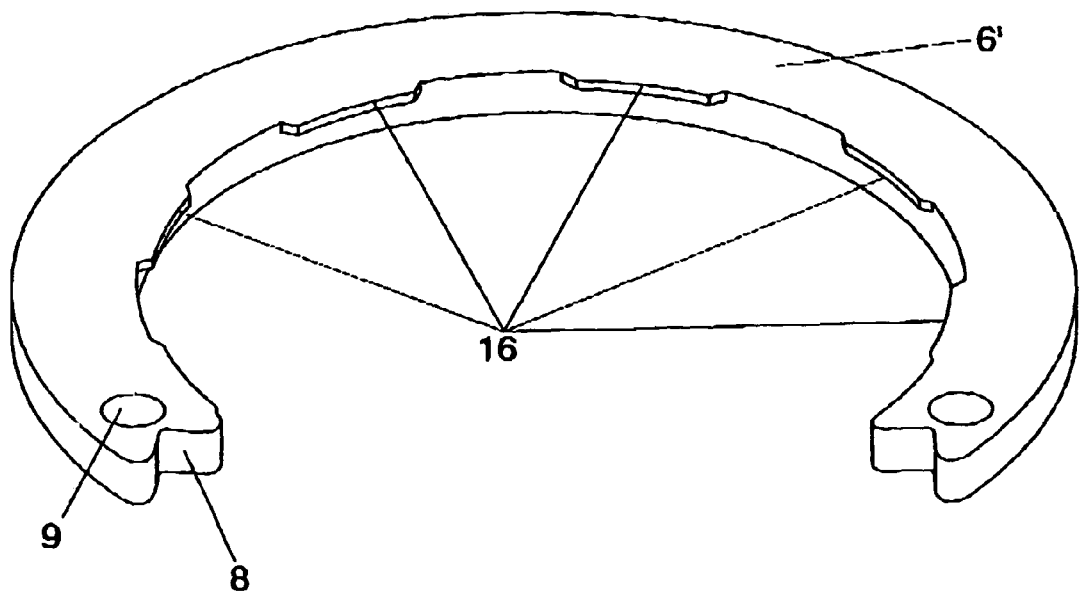
Figure 13:
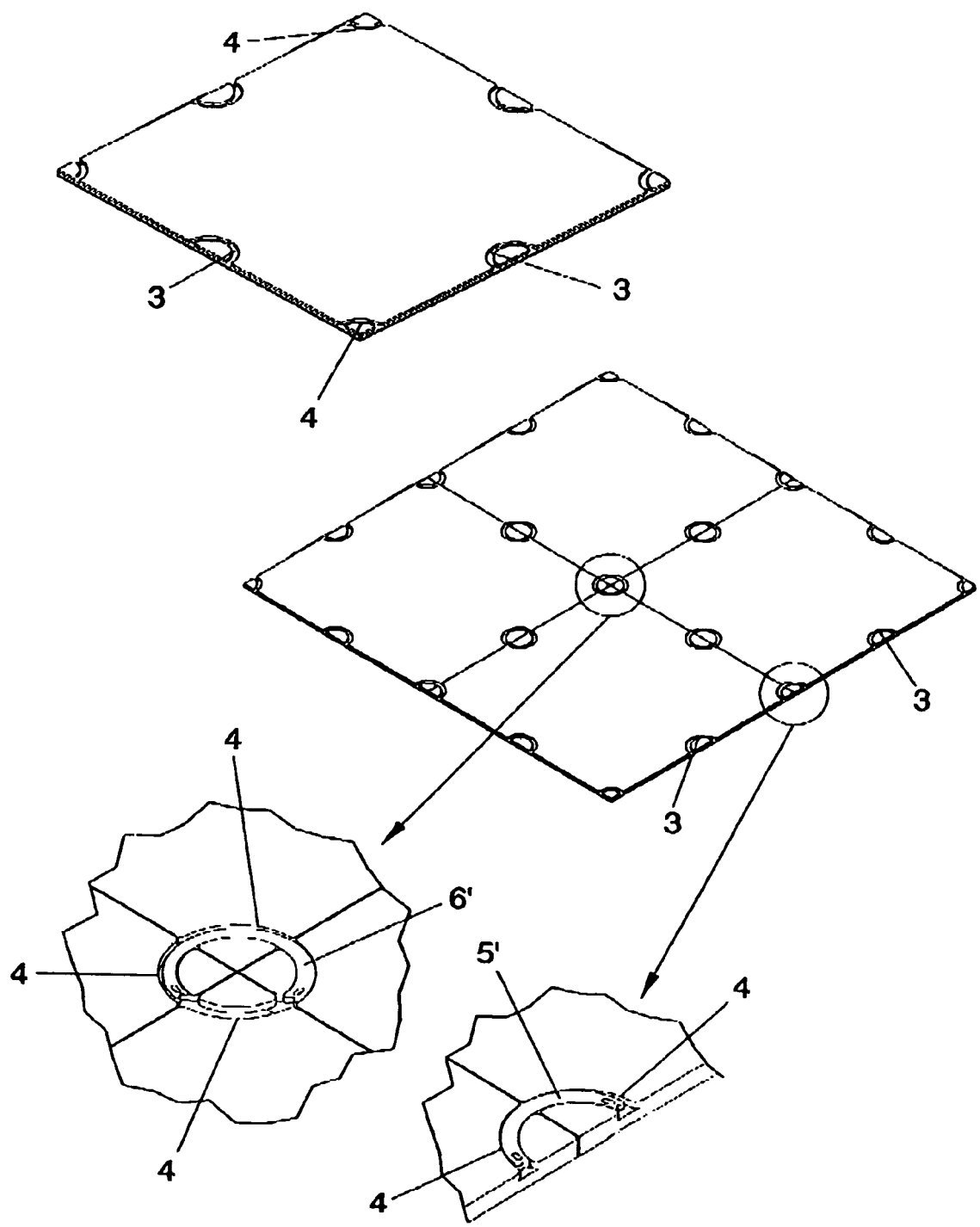
FIG. 13.—Shows a perspective view of the images shown in the three previous figures.
Figure 14:
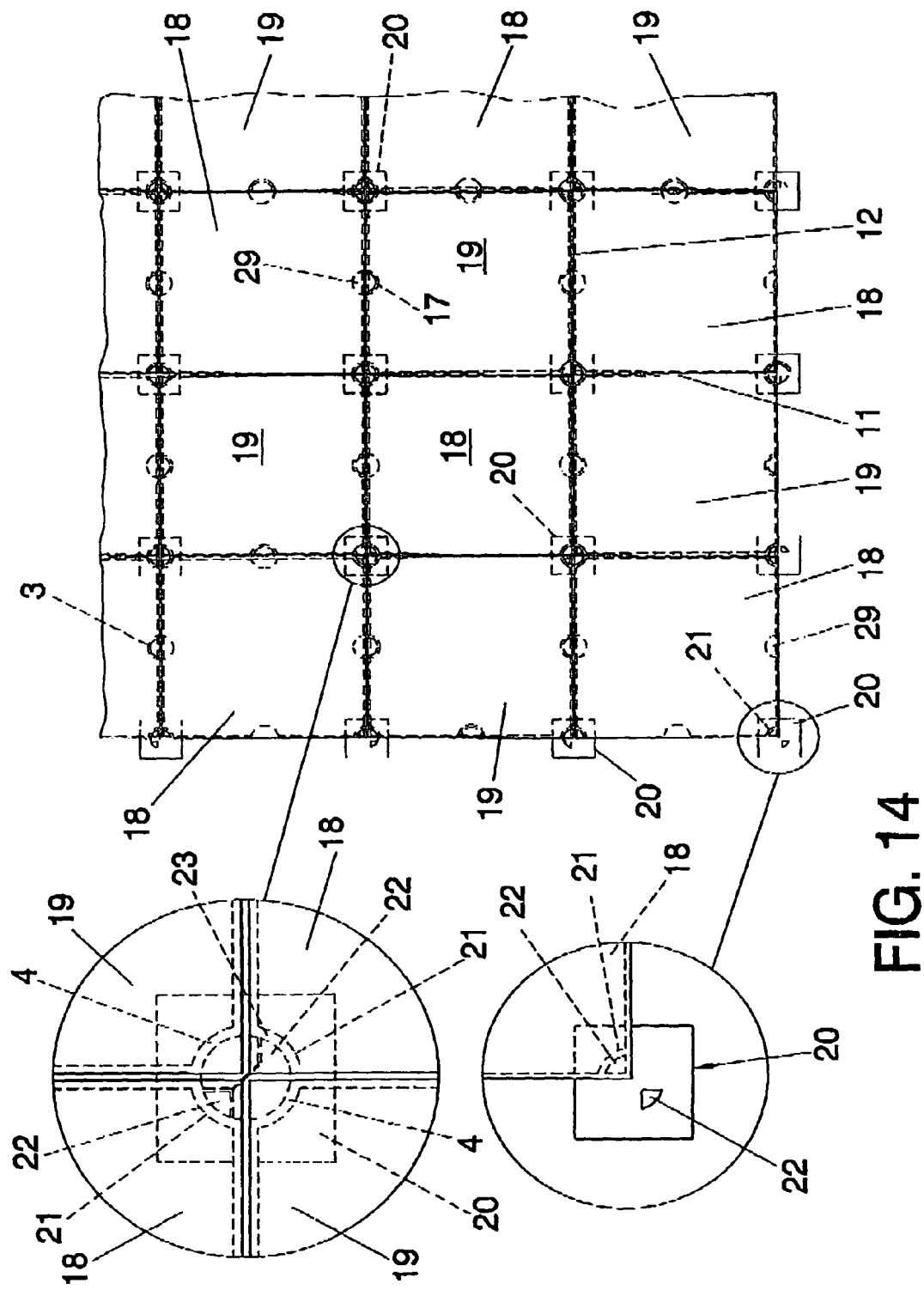
FIG. 14.—Represents another embodiment of the invention showing essentially a removable floor formed by the combination of removable tiles and fixed tiles that are all laid by resting by their corner ends on the characteristic wedges which elevation provides a removable raised floor.
Figure 15:
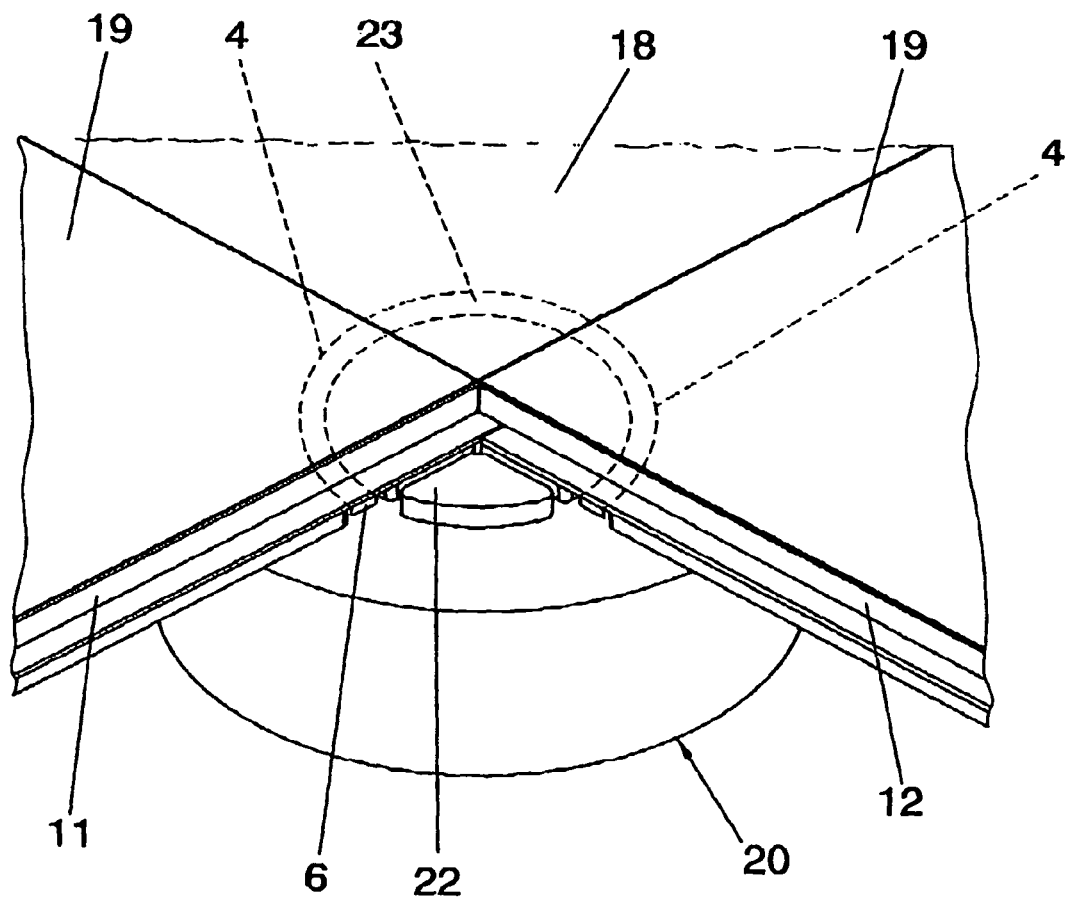
FIG. 15.—Shows a perspective view of the details shown in the previous figure.
Figure 16:
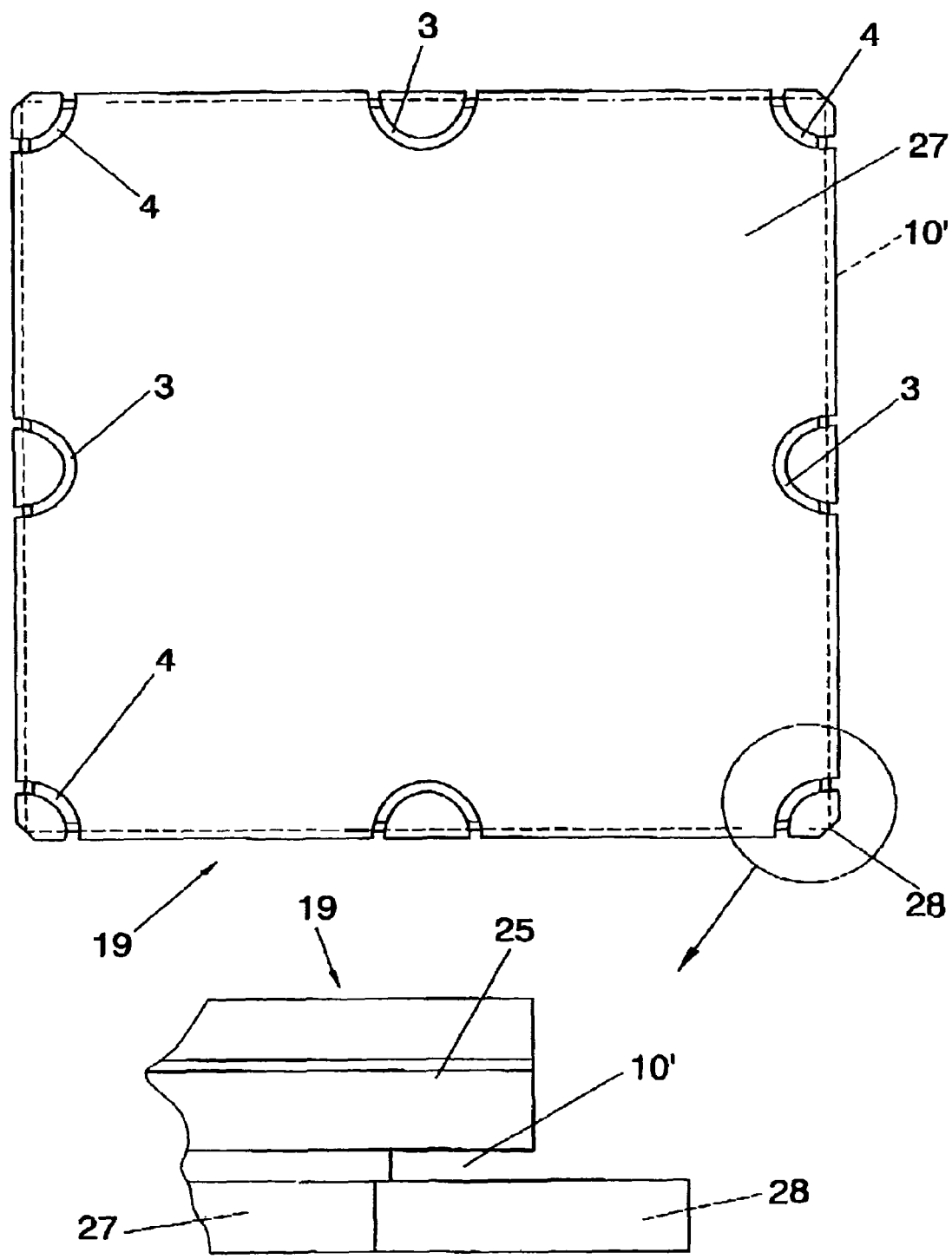
FIG. 16.—Shows a plan view of the underside of the fixed tile mentioned in FIG. 14.
Figure 17:
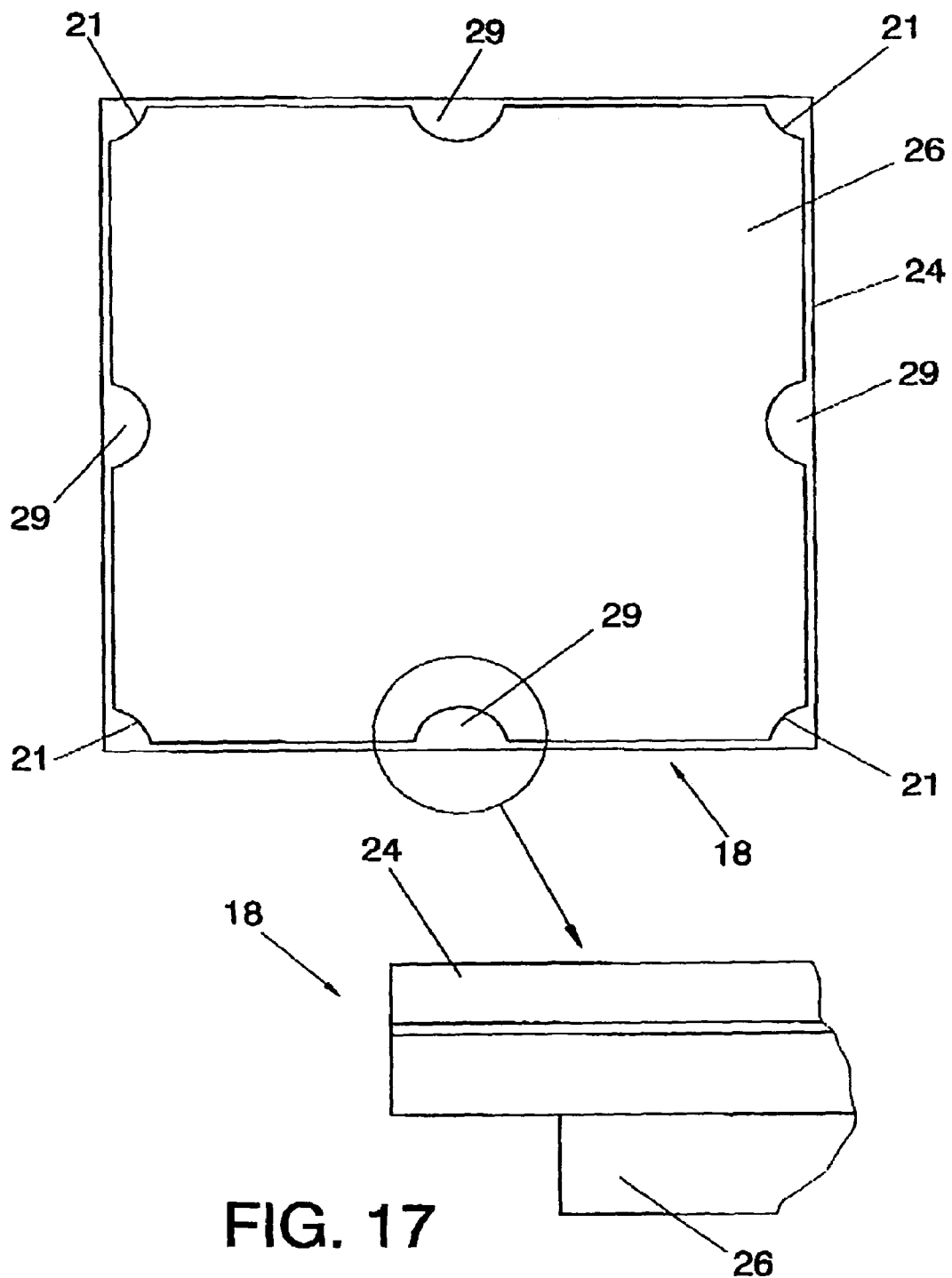
FIG. 17.—Shows a plan view of the underside of the removable tile mentioned in FIG. 14.
Figure 18:
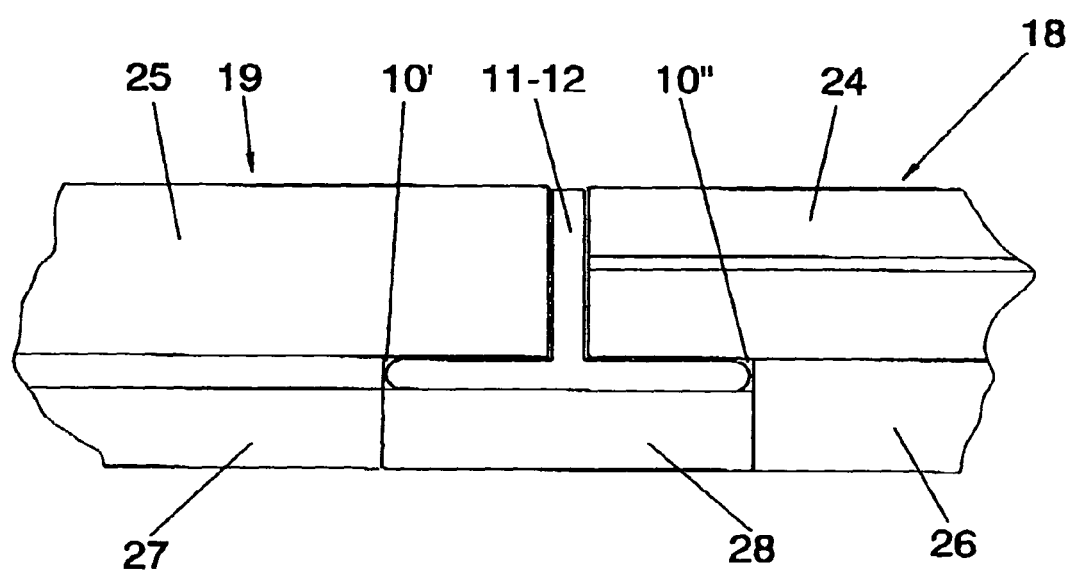
FIG. 18.—Shows a view of how two adjacent tiles are assembled by incorporating an intermediate spacing connector element.

The present invention is also applicable to tiles having other configurations. For instance, for hexagonal tiles (FIG. 6) the groove portions 7 will have an angular amplitude of 120° for the corner anchoring and of 180° for straight sides anchoring.

As it has been previously mentioned, the structure of the male elements comprise an open configuration that matches a curved portion having approximate angular amplitudes of essentially 180° and 270°.

Angular amplitude may be greater or smaller than those mentioned, because for hexagonal tiles, for instance, angular amplitude greater than 270° may be advisable, although an angular amplitude of 270° would suffice to encompass the convergent corners of two or three tiles.

Also the curvature radius of the male elements 5 and 6 may vary according to the tightening required by the tiles once inserted into position.

Also, the end portions of the male elements are fitted with cuts 8 and slits 9 intended to aid the assembly process, which width varies along their length, a fact that facilitates the laying into anchoring position operation.

Once the male elements have been inserted inside the respective groove channels they can slide guided by the channels to attain a tighter and more effective fit b using the aforementioned cuts and slits.

The perimeter tongue and groove elements comprise alternating and regularly distributed recesses 1 and projecting elements 2 that allow the offset assembly arrangement of adjacent tiles at any point of its contour, as well as their relative rotation, all aspects that can be appreciated in, for instance, FIG. 2.

Also, this tongue and groove system has a somewhat loose fit at the frontal and lower parts intended to create a space in which particles or strange bodies may be inserted once the floor has been assembled. Also, their rims are slightly curved to make the assembly process easier.

In another embodiment, the tiles incorporate on their edges or edge rims, perimeter slits 10 where intermediate primary 11 and secondary 12 spacing connector elements are inserted. Primary spacing elements 11 are longer than the secondary spacing elements 12 and match the dimensions of the tiles sides.

These spacing connector elements 11 and 12 have a profile shaped as an inverted "T" that works in such a manner that the branches of said profile fit inside the aforementioned opposing slits 10 of adjacent tiles while the cross tie of this spacing connector element is a narrow portion that spaces the tiles once the floor covering has been assembled.

The tiles are anchored together by means of male elements 5 and 6 that are inserted in grooved channels 13 located in the underside of the tiles, in such a manner that said channels are configured by curved portions 3 and 4 located so they correspond and match the edges of said tiles.

A possibility offered by the present invention is that the tiles may have as foot traffic support area ceramic elements 14 that will be joined to a lower base 15, which edges are the elements fitted with narrow slits 10 in which both arms of the spacing connector element will be inserted.

The angular amplitude of the male elements 5 and 6 is normally of 180° and 270°, although it can be greater or smaller, since, for instance, in the case of hexagonal tiles it may be more advisable to have an angular amplitude greater than 270°, although the existing angle would be sufficient to encompass two or three tiles by their convergent corner portions.

Also the curvature radius of the male elements 5 and 6 may vary according to the tightening required once they have been fit in place.

Also, the end portions of the male elements, as mentioned previously, are fitted with cuts 8 and slits or orifices 9 to aid in the assembly process. These elements have a variable width along its length to facilitate the tile laying operation into its definitely anchoring position.

Another embodiment incorporates male elements 5' and 6' having characteristic projections 16 located in their internal lateral side. Said projections are guided by and fit inside continuous grooves 17 located in the internal lateral face of grooved curved portions 3, 4 and 7.

Once male elements 5' and 6' have been inserted in the respective channels 13, they can be slid guided by the channels in order to attain a tight fit as aided by said cuts 8 and orifices 9, achieving a more effective guiding and affixing functions thanks to the characteristic projections 16 and complementary grooves 17.

It can also be noted that projections 16 and the complementary slits 17 are located at a given position in relation to the position of male elements 5' and 6' and groove portions 3, 4 and 7, although said projections could be located in different positions in relation to the position of said grooves and male elements.

Projections 16 and a grooves 17 could also be located on the external lateral face of the male elements and groove portions, respectively.

Another embodiment of the invention comprises a removable floor including a first group of removable tiles 18 and a second group of fixed tiles 19, all of which are assembled by laying their corner portions on top of characteristic wedges 20 which function is to raise the floor creating thus a space below the entire floor surface that serves to install wiring and utility conduits for various systems.

This is a floor essentially formed by quadrangular tiles, although the improvements herein contemplated can also be applied to tiles of different shapes.

Therefore, each wedge 20 supports the four converging corners of four adjacent tiles, two of them being diagonally laid removable tiles 18 and the other two fixed tiles 19 laid in the other diagonal direction, in such a manner that the removable tiles 18 incorporate in their underside rabbets shaped as a circular section 21 that match raised projections 22 arising from the upper side of said wedges 20 and being integral part of them.

A grooved channel 23 is formed between the curved lateral face of said raised projections 22 and the lateral curvature of the rabbets shaped as a circular section 21 that will receive the respective curved male element 6 that joins together the set of two fixed tiles 19.

To achieve this, the corner portions of the fixed tiles 19 are affected by portions of groove 4 that reach into the lateral edges of tiles, in such a manner that said groove portions 4 receive sections of the curved male elements 6 having the required angular amplitude, said male elements also fitting grooved portions 23 generated in removable tiles 18, but somewhat loosely, as opposed to what is the case for groove portions 4 of fixed tiles 19 inside which male elements 6 fit tightly.

Both tile groups 18 and 19 incorporate a perimeter step or bevel that serves as separating element of two different surfaces: upper surface parts 24 and 25 and lower surface parts 26 and 27.

In the case of removable tiles 18 the surface of upper part 24 is larger than the surface of the lower part 26, while for fixed tiles 19 the surface of the upper part 25 is smaller than the surface of lower part 27. Also, in this case, the corners of lower part 27 have a 45° bevel 28 tangent to the vertices of the upper part 25 of these tiles 19, which makes possible that both types of tiles 18 and 19 can be fit together to form the floor covering object of the invention.

The invention also incorporates the spacing joining elements 11 and 12 between tiles. These elements are shaped as an inverted "T". One of its arms fits inside perimeter groove 10' located so it matches the perimeter bevel of said fixed tiles 19 while the cross tie of this spacing element will abut the border rim of the tile edges of upper parts 24 and 25 of tiles 18 and 19.

The other mirror arm of spacing connector elements 11 and 12 will fit inside a groove 10" delimited between the narrow upper bands of the lower part 27 of the fixed tiles 19 and the perimeter bands of the upper part 24 of removable tiles 18.

The removable tiles 18 incorporate semicircular rabbets 29 in the central area of their sides. These rabbets face portions of the semicircular groove channels 3 of fixed tiles 19 where other curved male elements 5 will be inserted in order to obtain a more stable floor surface.

The positions of the semicircular rabbets 29 and portions of groove 3 coincide with the thickness of lower parts 26 and 27 of both types of tiles.

Another consideration is that with this type of tiles allow configuring raised removable floors that create space to house wiring and utility conduits as mentioned previously because they can be installed in a raised arrangement. Also, to facilitate inspections or repairs of the various installations, the removable tiles can be lifted with suction cups or similar devices. When the tiles are quadrangular their arrangement coincides with a chessboard type configuration. The fixed tiles can be simply assembled together by means of male elements that join them together by their undersides.

FIGS. 19 to 25 show other embodiments of the invention. The tiles, in this case are fitted in their lateral edges with pairs of male and female elements to facilitate the tongue and groove coupling system of the tiles, in such a manner that said male and female elements feature a characteristic structure that allows directing the assembly and coupling of the tiles, achieving the definite positioning of each element correctly in relation to the remaining floor elements in a passive manner. This is possible because the structure is equipped with passive guiding and coupling means that facilitate the assembly process. Said means comprise assembly surfaces having an incoming angle between 1 and 45°, to ensure the correct placing of the elements that configure the floor surface. Also, the tongue and groove coupling system helps to level the tiles.

The male and female elements are preferably located midpoint of the tile thickness.

Figure 19:
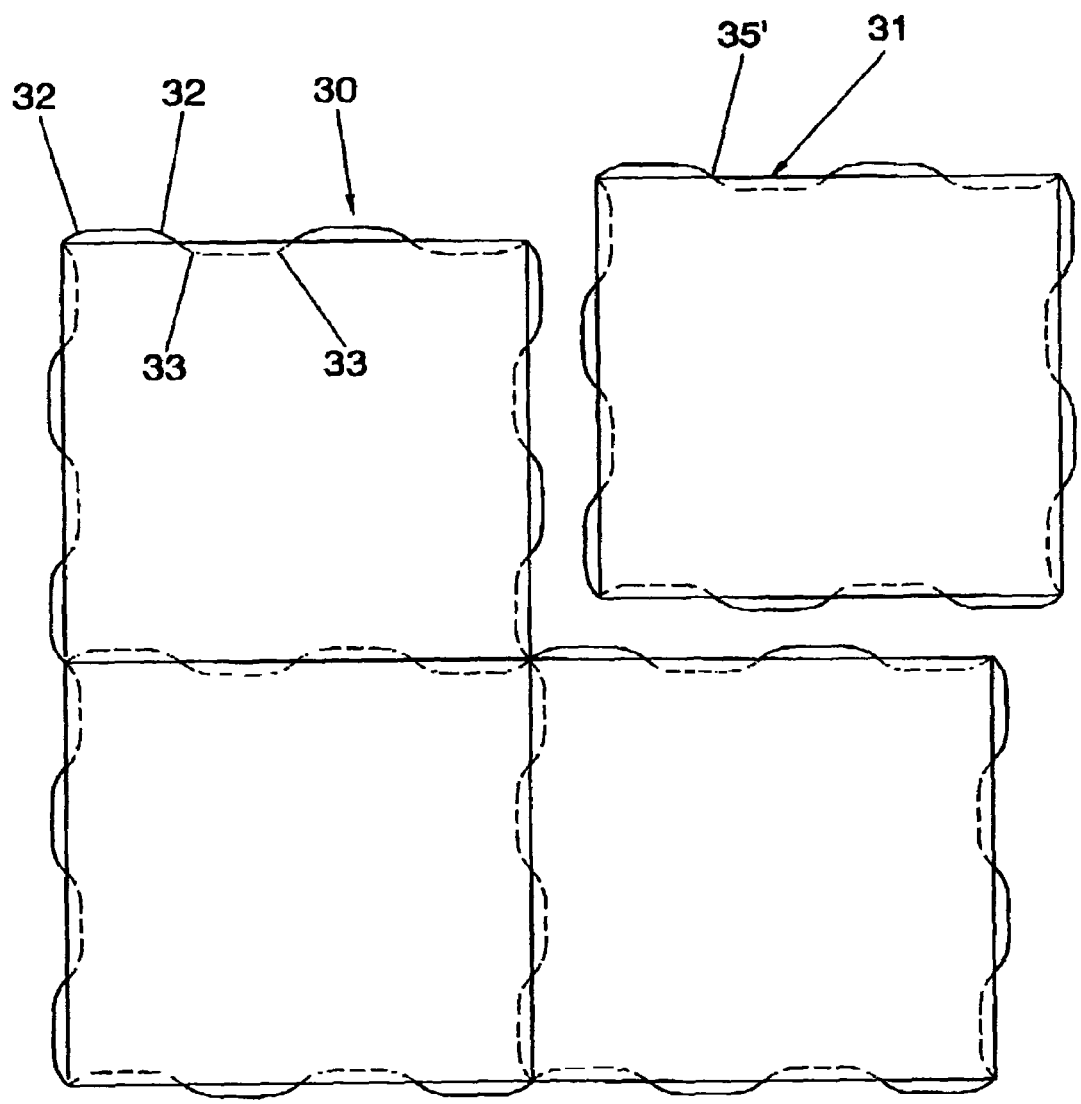
FIG. 19.—Shows a plan view of a portion of the tile wall and/or floor covering, each one incorporating on its edges a characteristic arrangement of male and female elements.
Figure 20:
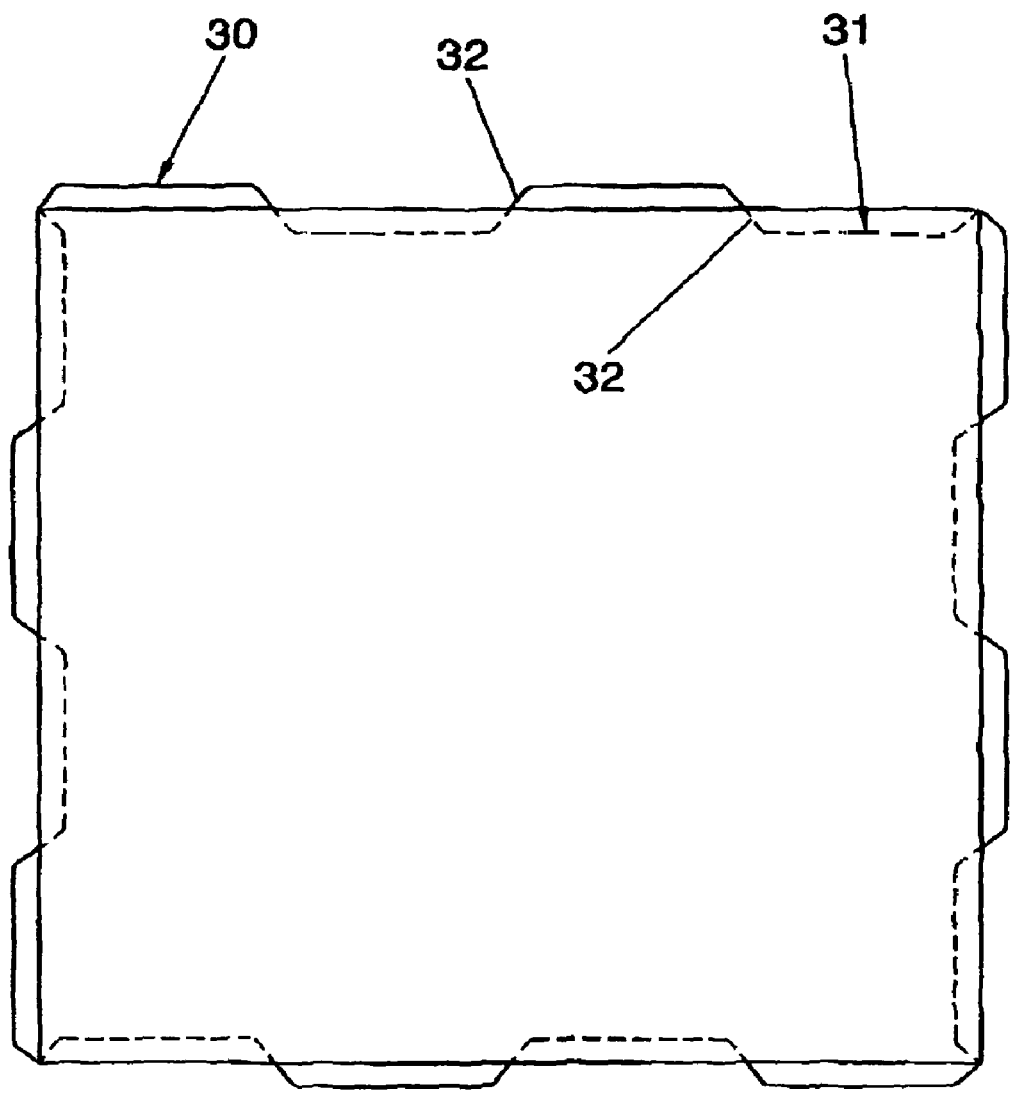
FIG. 20.—Shows a plan view of a tile similar to those represented in previous figures.
Figure 21:
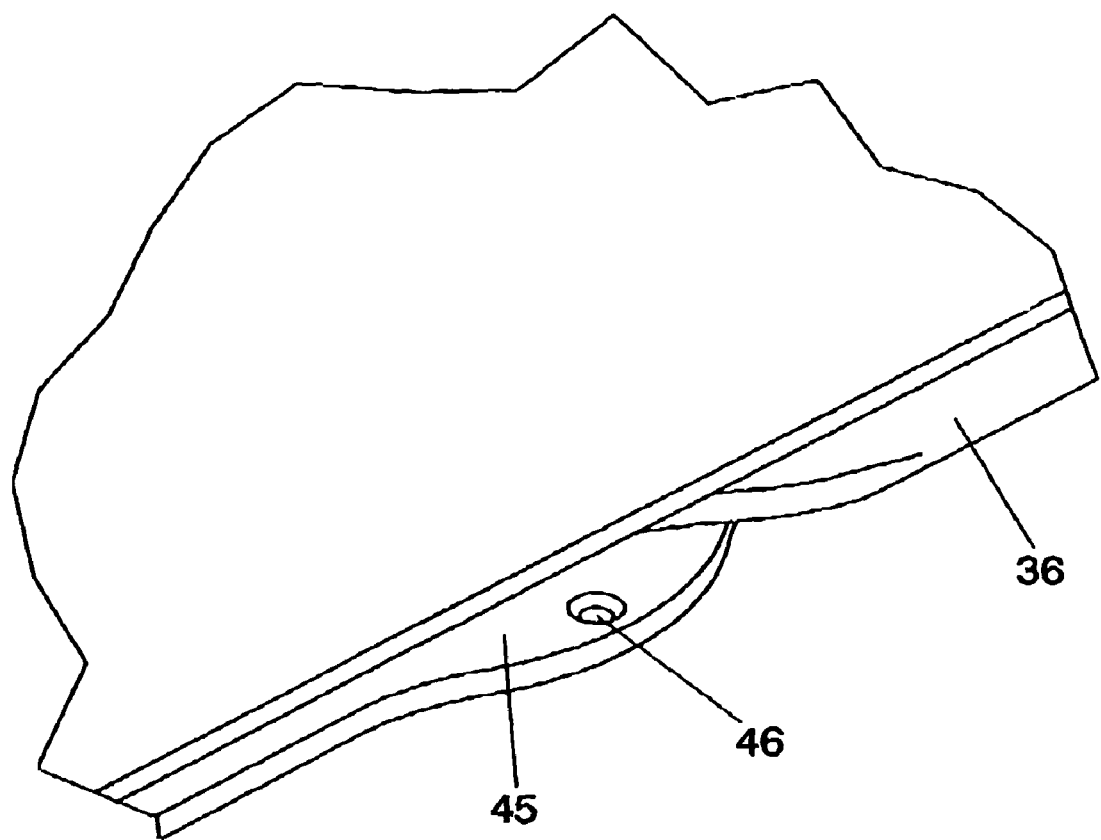
FIGS. 21 and 22.—Show tile extensions fitted with orifices to anchor the tiles to the surface to be covered by means of screws.
Figure 22:
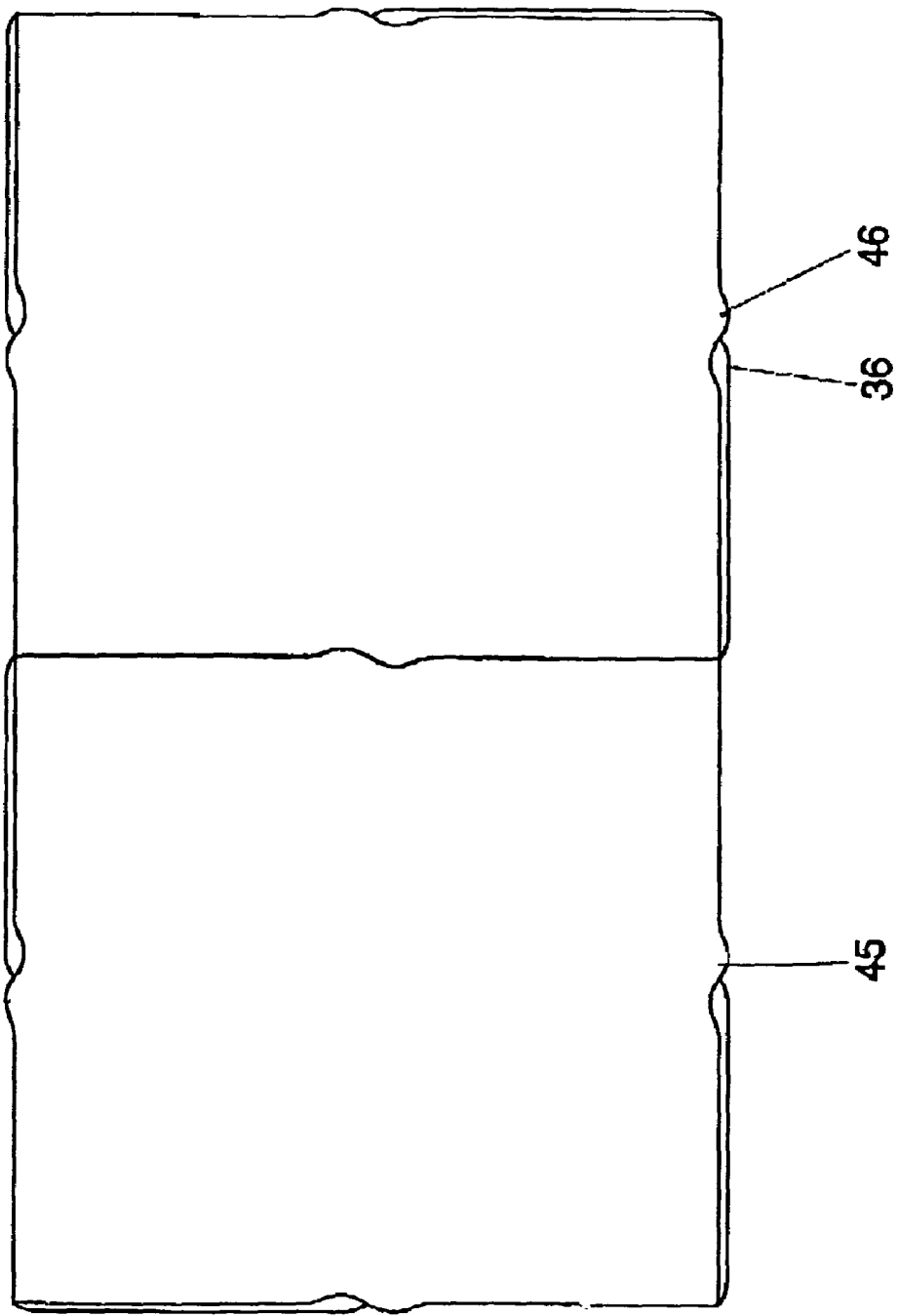

In a preferred embodiment shown in FIGS. 19 and 20, the male elements 30 and the female elements 31 comprise symmetrical end portions 32 converging outwards in the male elements and inwards in the female elements. More specifically, the male 30 and female 31 elements may display a regular trapezoidal configuration in which the tilted sides will match the aforementioned symmetrical end portions 32.

A particular case of this last embodiment comprises tilted planes of end portions 32 are fitted with arched ends with curvoconcave sections 33 and with curvoconvex sections 34 that will come together at inflexion point 35' thus making the tilted plane disappear. Naturally, the possibility of having a tilted plane to join both curvoconcave and curvoconvex sections exists as shown in FIG. 20.

Figure 23:
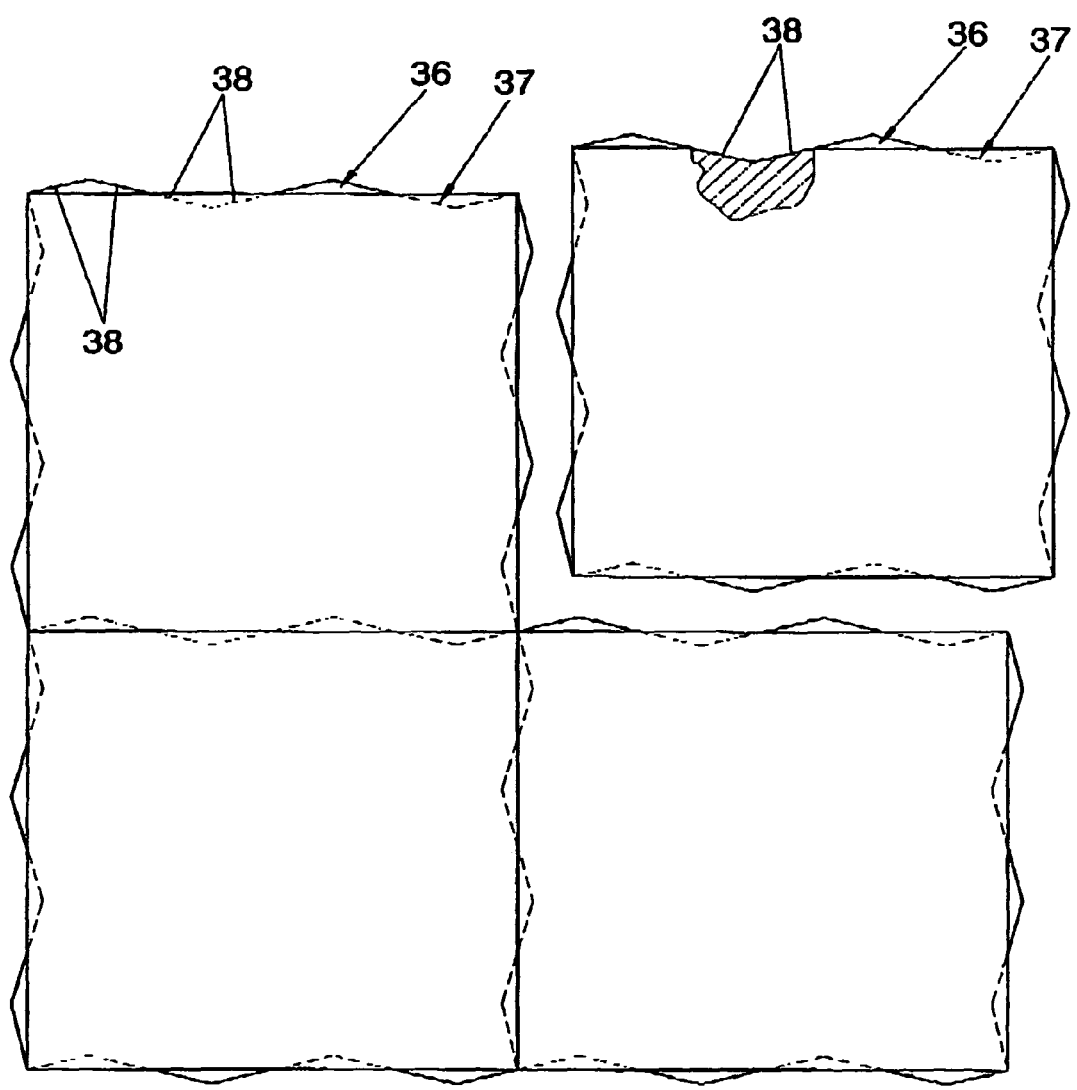
FIGS. 23 to 25.—Show respective views of the tiles object of the invention depicting different embodiments than those previously represented.

In another embodiment shown in FIG. 23, the male elements 36 and female elements 37 feature an angular structure, each of which is bounded by two symmetrical assembly surfaces or sections 38 that converge on a common vortex that could be rounded and even truncated. According to the plan view shown the traveling path in this case is shaped as a triangular wave.

Figure 24:
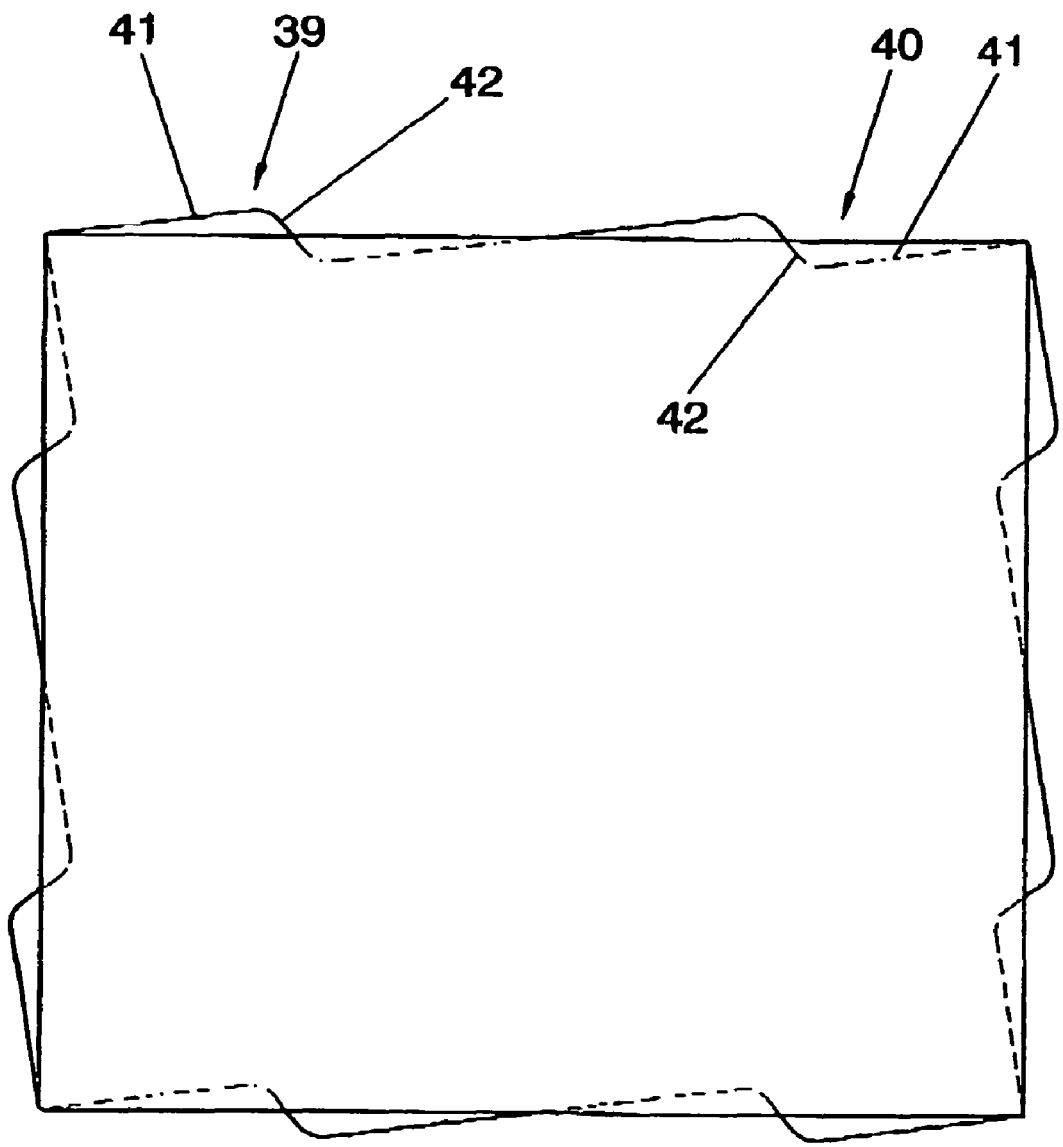

In another embodiment shown in FIG. 24, the male 39 and female 40 elements also display an angular structure, but the sections are different from each other, having a larger section 41 and a smaller section 42, which give their planar path a saw tooth shape.

Figure 25:
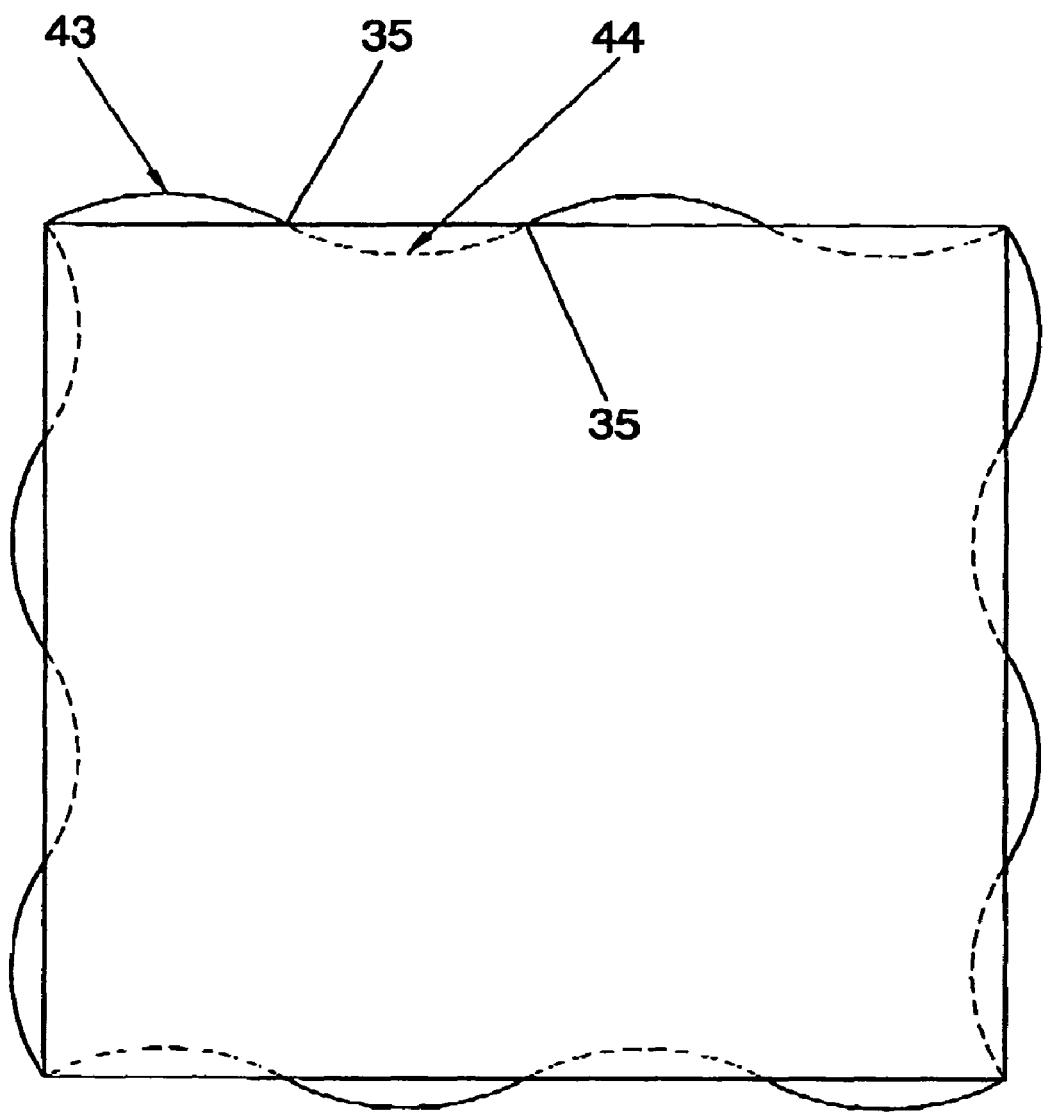
Figure 26:
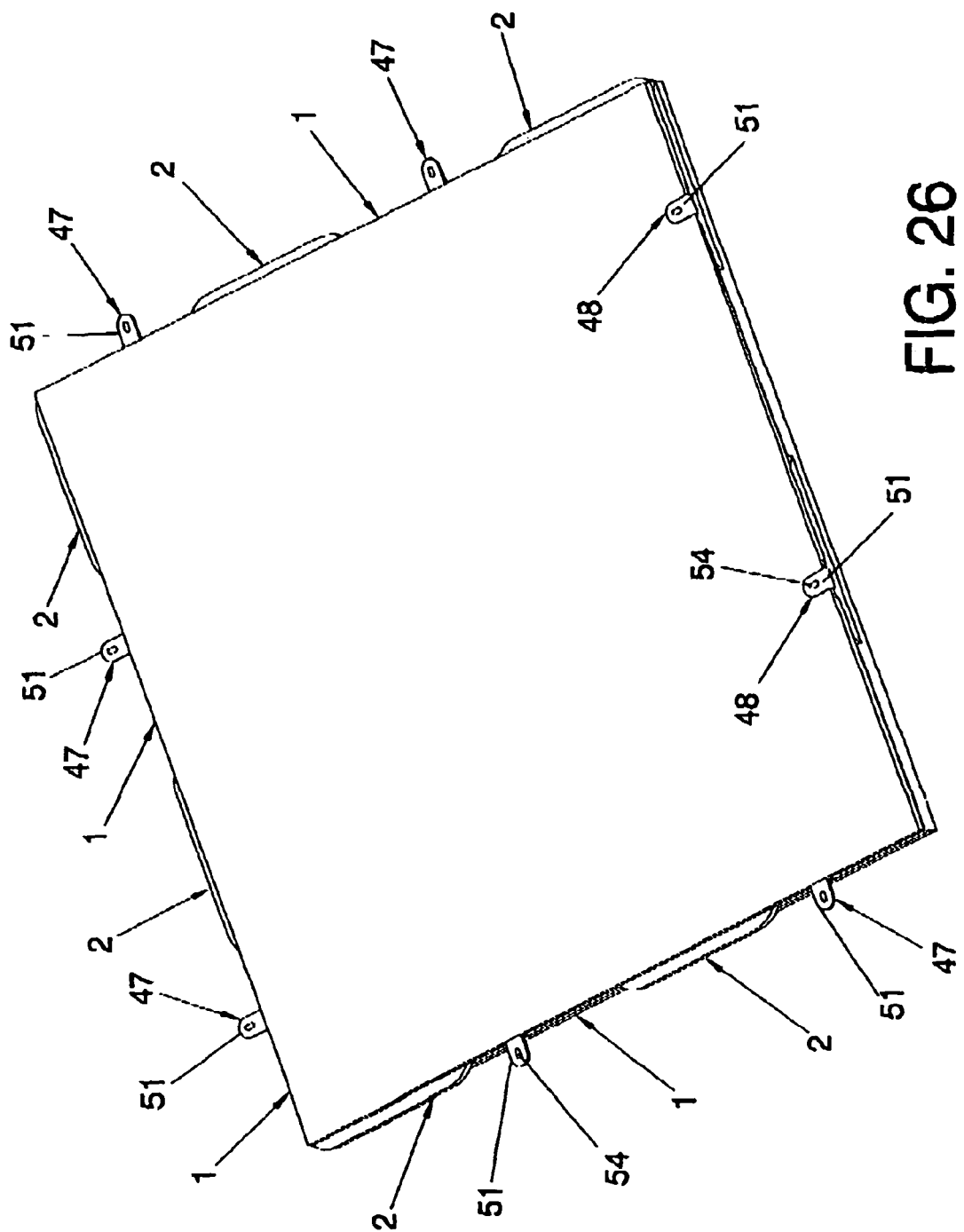
FIG. 26.—Shows a perspective view of a tile fitted with anchoring means intended to affix it to a floor surface or to a vertical wall.
Figure 27:
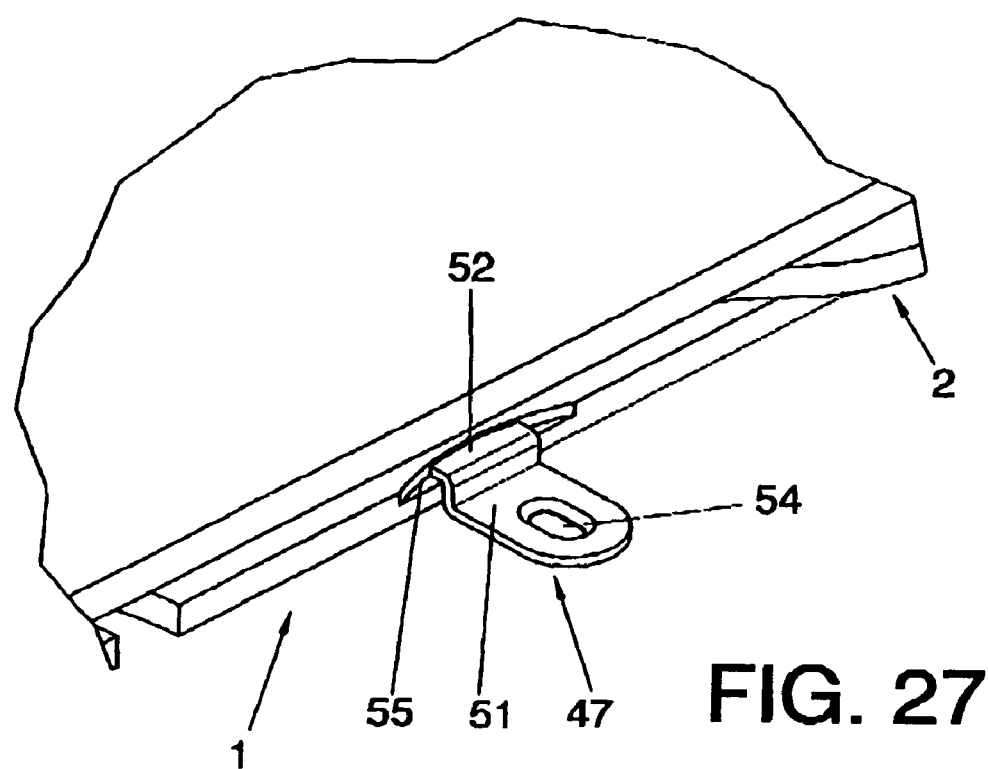
FIGS. 27 and 28.—Show perspective views of the detail of the anchoring means depicted in the previous figures.
Figure 28:
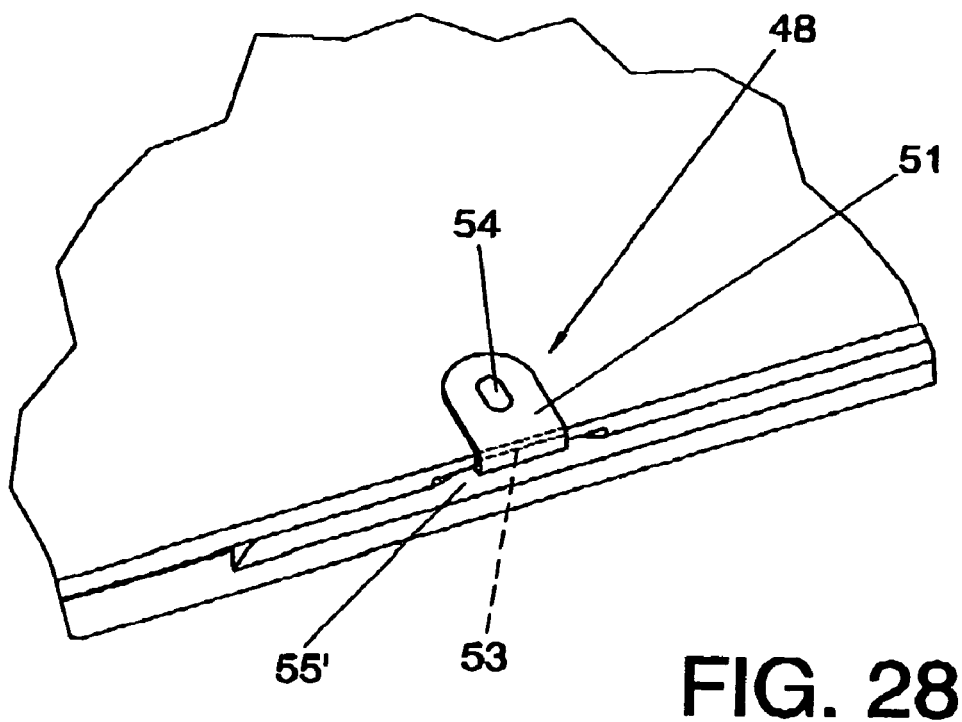

In another embodiment shown in FIG. 25, the combination of male elements 43 and female elements 44 configure a travel path shaped as a sinuous wave where the male elements 43 connect to adjacent female elements 44 at an inflexion point 35 where the curvoconvex curvature (male portion) changes to a curvoconcave curvature (female portion).

There is a possibility of creating extensions 45 to create a cavity for tile-to-surface anchoring means by incorporating orifices 46 through which a screw or similar affixing element can pass through.

In this case, the tile will be screwed or affixed to the assembly surface to ensure appropriate immobilization of the tile.

The female portion 37 will be suitably machined 45 to receive the oversized portion of male element 36.

FIGS. 26 to 29 show tiles than in addition to male elements 2 and female elements 1, include independent anchoring elements 47 and 48 to ensure appropriate immobilization and anchoring of the tiles as they are being assembled on the floor or wall surface to be tiled in which the anchoring is reinforced with screws 49.

The possibility exists to incorporate elongated wedges 50 to which the screws can be threaded through orifices made in the surface to be tiled.

The anchoring elements 47 and 48 have a flat base 51 that sits on the surface to be tiled, and an elbow shaped section materialized in two different embodiments to engage and affix the tiles by their edges.

One of said embodiments comprises an elbow shaped section having an end portion 52 parallel to the flat base, but pointing outwards in the opposite direction to base 51.

In the second embodiment the elbow shaped section has an end portion 53 also parallel to base 51, but located above the end portion of said base 51.

In both cases the flat base 51 is affected by a slitted orifice 54 configured in a conical shape through which screw 49 passes and in which said screw head fits.

In both embodiments, end portions 52 and 53 of the elbow shaped sections fit inside elbow shaped rabbets 55 and 55' fitted in the edge rims of the tiles.

In one embodiment, the flat base 51 of anchoring element 47 is located outside the planar surface occupied by the tiles, while in the second embodiment the flat base 51 of anchoring element 48 is located below a portion of that same tile and resting on said flat base 51.

Figure 29:
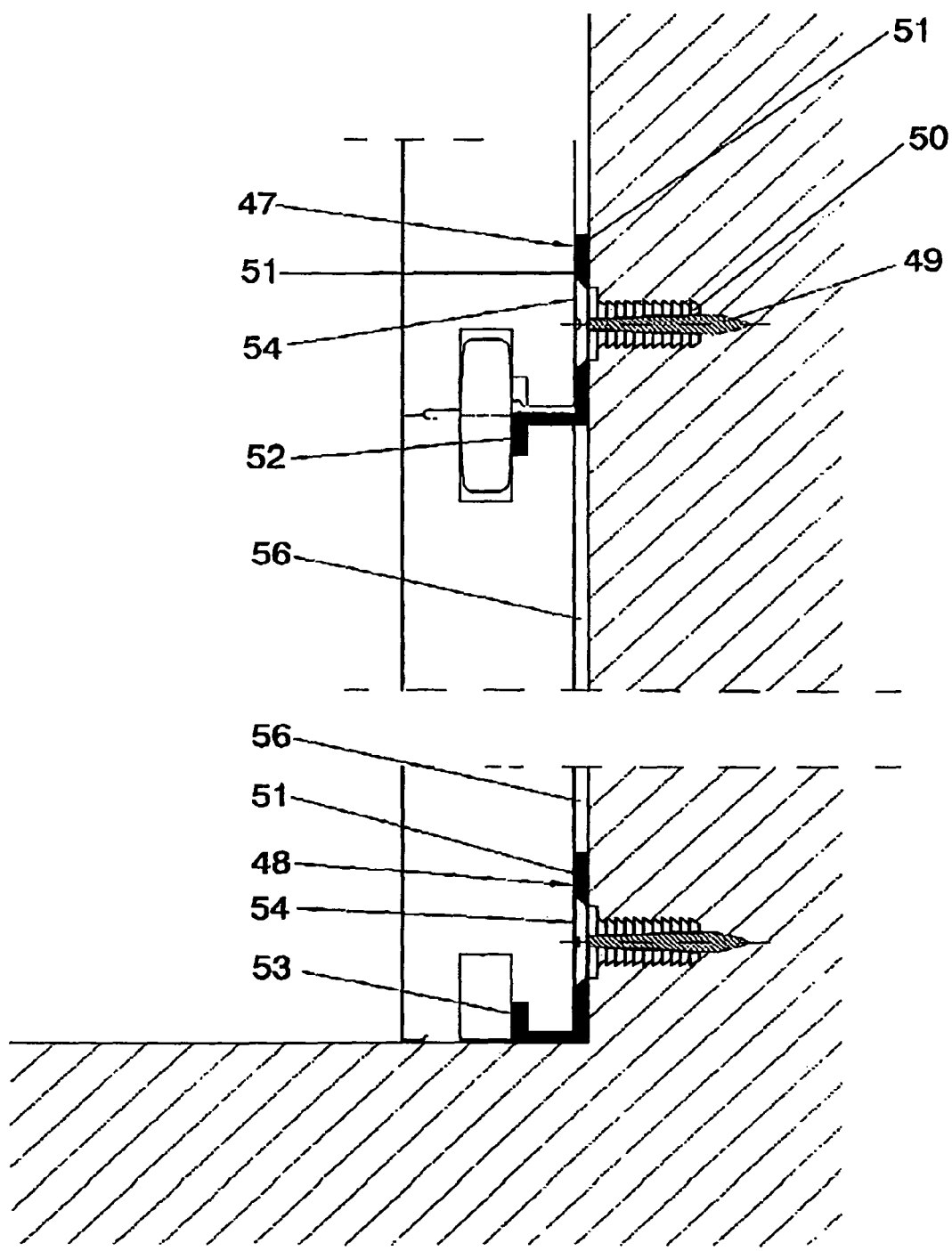
FIG. 29.—Show a section view of the application of the anchoring means described in the three previous figures.

Normally anchoring element 48 is used in the lower part of walls adjacent to the corner that separates floor from vertical wall at the beginning of the tile installation on the vertical wall (FIG. 29).

The last observation is that a characteristic insulation chamber 56 is formed between the tiles and the surface to be covered that improves assembly conditions, especially on irregular walls or floors or in walls or floors affected by humidity.

The invention claimed is:

1. An assembly system for floor and/or wall tiles, comprising anchoring means between the tiles arranged in a coplanar plane; wherein said anchoring means are set out by curved portions shaped as a groove (3, 4 and 7) located in the underside of at least some of the tiles and corresponding to the side edges of the tiles, said curved portions converging in said edges, said curved portions configuring, when assembled head to head and at the corner convergences, channels on the underside of the tiles inside in at least a portion of which male elements (5 and 6) are inserted by applying pressure to couple together at least two adjacent tiles, where end portions of said male elements incorporate centered cuts (8) and slits (9); each of said tiles incorporating in its lateral edges male and female portions that are mutually complementary and are arranged in alternated fashion along the perimeter of the tile in an even and variable number at each side of the tile, in such a manner that the tile elements can be assembled in an offset manner according to the number of alternating elements of the tile, and allowing the tiles elements to rotate in any direction, said male and female portions include a structure fitted with guide means to passively guide the tile assembly, coupling and leveling processes, said guide means comprising assembly surfaces with an incoming angle between 1° to 45°.

2. An assembly system for floor and/or wall tiles, according to claim 1, wherein it comprises independent anchoring means determined by anchoring elements (47 and 48) that are affixed to the surface to be covered with the tiles, said anchoring elements (47 and 48) having a terminal section that engages an area of the border line of the edge of the lateral edges of tiles, while said anchoring elements (47 and 48) are hidden from view by the tiles themselves.

3. An assembly system for floor and/or wall tiles, according to claim 2, wherein the anchoring elements (47 and 48) have an elbow-shaped portion that adapts to the border line of the tile's edge and flat base (51), through which the anchoring elements (47 and 48) are affixed by a fastener (49) that goes through an orifice (54) located in said base (51).

4. An assembly system for floor and/or wall tiles, according to claim 3, wherein the elbow-shaped portion of the anchoring elements (47 and 48) match their complementary rabbets (55 and 55') located in the border line of the tile's edge.

5. An assembly system for floor and/or wall tiles, according to claim 1, wherein the male elements (5 and 6) comprise a curved rigid structure describing the same path as the curved channels.

6. An assembly system for floor and/or wall tiles, according to claim 1, wherein the width of the male elements (5 and 6) is variable across its length.

7. An assembly system for floor and/or wall tiles, according to claim 1, wherein the tile edges comprise continuous slits (10) where longer primary joints (1) and shorter secondary joints (12) are inserted to serve as narrow spacing and leveling elements between tiles.

8. An assembly system for floor and/or wall tiles, according to claim 7, wherein the joints (11 and 12) present, essentially, a profile shaped as an inverted "T" having arms inserted inside the facing slit pairs (10) of the two adjacent tiles, and a cross tie serving as a narrow spacing element between tiles.

9. An assembly system for floor and/or wall tiles, according to claim 7, wherein the tiles comprise a lower base (15) which edges incorporate the continuous slits (10) and upper parts (14), both joined to the lower base (15); said upper parts being made of one of ceramics and wood.

10. An assembly system for floor and/or wall tiles, according to claim 1, wherein at least one of the lateral faces of the male elements (5' and 6') incorporates at least an alignment of projections (16) complemented by a groove (17) made in at least one of the lateral faces of curved portions (3, 4 and 7) of the tiles; said projections (16) being fitted and adjusted to said grooves (17) when the male elements (5' and 6') are coupled to the curved portions (3, 4 and 7) that configure the channels made in the underside of the tiles.

11. An assembly system for floor and/or wall tiles, according to claim 10, wherein projections (16) and grooves (17) are essentially located in the internal lateral faces of the male elements (5' and 6') and the internal lateral faces of the curved portions (3, 4 and 7) respectively.

12. An assembly system for floor and/or wall tiles, according to claim 10, wherein projections (16) and grooves (17) are arranged so they match one of the bases of the male elements (5' and 6') and the extension of the bottom of the grooved curved portions (3, 4 and 7).

13. An assembly system for floor and/or wall tiles, according to claim 1, wherein it comprises a combination of removable tiles (18) and fixed tiles (19) all of which sit on wedges (20) by their corner portions, the corners of all converging tiles resting on the same wedge, and where said wedges (20) are fitted with raised portions (22) that match corner rabbets (21) located in the underside of the removable tiles (18), while the corner portions of the fixed tiles (19) incorporate the grooved curved portions (4) in which the curved male elements (6, 6') are inserted occupying also the grooved portions (23) generated so they match the corner-shaped rabbets (21) and a part of the removable tiles (18).

14. An assembly system for floor and/or wall tiles, according to claim 13, wherein the perimeter of both tile groups (18 and 19) is staggered, separating an upper part having a larger surface (24) and a lower part having a smaller surface (26) in the removable tiles (18), while in the fixed tiles (19) the upper part (25) has a smaller surface and the lower part (27) has a larger surface, and in which the corners of said part (27) have a bevel (28) cut at a 45° tangent to the vertices of the upper part (25) of said fixed tiles (19); all of it intended so the removable and the fixed tiles (18 and 19) can be matched together to configure a floor covering.

15. An assembly system for floor and/or wall tiles, according to claim 14, wherein the rabbets (21) and the grooved curved portions (4) have the same height and thickness as the lower parts (26 and 27) of both types of tiles (18 and 19).

16. An assembly system for floor and/or wall tiles, according to claim 14, wherein the fixed tiles (19) incorporate grooves (10') matching the perimeter stagger line intended as housing where one of the arms of the spacing joining elements shaped as an inverted "T" (11 and 12) will be inserted, and which cross tie when inserted will contact the edges of the upper parts (24 and 25) of both types of tiles (18 and 19), while the other mirror arm will fit in a different set of grooves (10") delimited by a narrow perimeter band located in the lower part (27) of the fixed tiles (19) and a perimeter band of the upper part (24) of the removable tiles (18).

17. An assembly system for floor and/or wall tiles, according to claim 13, wherein grooved portions (23) configure an arched space that coincides with the curvature of a section of the male anchoring elements (6, 6').

18. An assembly system for floor and/or wall tiles, according to claim 13, wherein the removable tiles (18) incorporate other semicircular rabbets in their underside (29) and located on the sides, where they complement other groove portions (3) where other curved anchoring male elements fit for adjustment (6, 6').

19. An assembly system for floor and/or wall tiles, according to claim 1, wherein the lower face of the female portion is fitted with projections or tabs (45) provided with orifices (46) through which the tile anchoring means pass to go through the covered surface and home into the inlets located in the lower face of the tile element under the male portion that match projections or tabs (45).

20. An assembly system for floor and/or wall tiles, according to claim 1, wherein the structure of the male and female elements equipped with guiding means comprise symmetrical end portions (32) that converge outwards on the male elements (30) and inwards in the female elements (31).

21. An assembly system for floor and/or wall tiles, according to claim 20, wherein some of the ends of the symmetrical end portions (32) are curvoconcave (33) and some curvoconvex (34) and come together at an inflexion point (35').

22. An assembly system for floor and/or wall tiles, according to claim 1, wherein the structure of the male and female elements con guiding means they comprise an angular configuration having a planar course shaped as a triangular wave.

23. An assembly system for floor and/or wall tiles, according to claim 22, wherein the structure of the male (36) and female (37) elements shaped as triangular wave comprise two symmetrical sections (38).

24. An assembly system for floor and/or wall tiles, according to claim 22, wherein the structure of the male and female elements shaped as triangular wave comprises two sections of different lengths, a longer (41) and a shorter (42) section.

25. An assembly system for floor and/or wall tiles, according to claim 1, wherein the structure of the male and female elements equipped with the guiding means comprise an arched configuration (43 and 44) having a planar path shaped as a sinuous wave, which adjacent sections come together at an inflexion point (35).

26. An assembly system for floor and/or wall tiles, according to claim 1, wherein the male and female elements are arranged so they face each other on opposite sides of the tile.

27. An assembly system for floor and/or wall tiles, according to claim 1, wherein the male and female elements are located half-way on the width of the edge of the tiles and the male elements stick out of the maximum perimeter of the visible surface of the tiles, while the female elements are hidden inside said maximum perimeter.

28. An assembly system for floor and/or wall tiles, according to claim 4, wherein the end element (52) of the elbow-shaped portion of the anchoring element (47), rests on a seat of the rabbet (55) located on the border line of the tile edge of tiles, so the flat base (51) sticks outside the contour line of the tiles that is secured by this anchoring element (47).

29. An assembly system for floor and/or wall tiles, according to claim 4, wherein the end element (53) of the elbow-shaped portion of anchoring element (48) is inserted inside a recess of the rabbet (55') located on the border line of the tile edge of tiles, so the flat base (51) remains then under the tile that is holding.

30. An assembly system for floor and/or wall tiles, according to claim 1, wherein said incoming angle is between 25° and 44°.

* * * * *